US010559029B2

(12) United States Patent
Kumar

(10) Patent No.: US 10,559,029 B2
(45) Date of Patent: Feb. 11, 2020

(54) SYSTEM AND METHOD FOR MANAGEMENT AND ACTIVATION OF CONDITIONAL BID OFFERS

(71) Applicant: Ashish Kumar, Lewisville, TX (US)

(72) Inventor: Ashish Kumar, Lewisville, TX (US)

( * ) Notice: Subject to any disclaimer, the term of this patent is extended or adjusted under 35 U.S.C. 154(b) by 1120 days.

(21) Appl. No.: 14/843,452

(22) Filed: Sep. 2, 2015

(65) Prior Publication Data
US 2015/0371324 A1 Dec. 24, 2015

Related U.S. Application Data

(63) Continuation of application No. PCT/IB2013/051926, filed on Mar. 12, 2013.

(51) Int. Cl.
*G06Q 30/08* (2012.01)
*G06Q 30/06* (2012.01)

(52) U.S. Cl.
CPC ......... *G06Q 30/08* (2013.01); *G06Q 30/0609* (2013.01)

(58) Field of Classification Search
CPC .................................................. G06Q 30/0609
USPC ...................................................... 705/26.3
See application file for complete search history.

(56) References Cited

U.S. PATENT DOCUMENTS

| 6,260,024 B1 | 7/2001 | Shkedy |
| 7,778,882 B2 | 8/2010 | Chatter et al. |
| 2001/0014878 A1 | 8/2001 | Mitra et al. |
| 2001/0056395 A1 | 12/2001 | Khan |
| 2002/0062275 A1* | 5/2002 | Dyke .................. G06Q 10/087 705/37 |
| 2006/0085289 A1 | 4/2006 | Lotvin et al. |
| 2007/0185775 A1 | 8/2007 | Lawton |
| 2010/0023357 A1* | 1/2010 | Walker .................. G06Q 10/02 705/5 |
| 2010/0094669 A1* | 4/2010 | Walker .................. G06Q 10/02 705/5 |
| 2010/0287062 A1* | 11/2010 | Liang .................... G06Q 20/12 705/26.1 |
| 2011/0178897 A1* | 7/2011 | Balasubramanian .. G06Q 20/12 705/27.1 |
| 2012/0123946 A1* | 5/2012 | Walker .................. G06Q 10/02 705/50 |
| 2013/0060641 A1* | 3/2013 | Al Gharabally ....... H04H 60/63 705/14.66 |

* cited by examiner

*Primary Examiner* — Alexis M Casey
(74) *Attorney, Agent, or Firm* — Marin Patents LP; Gustavo Marin

(57) ABSTRACT

A method and system for processing and managing activation of conditional offers initiated by a buyer device and bid offer responses from multiple seller devices. The method and system of the present invention comprise a mechanism for buyer devices to request bid offers from multiple seller devices using product keywords; seller devices to provide an offer for an exact or similar product with a condition; the buyer device activating the condition by quantifying a purchase intent for completing the transaction; buyer devices may be used to review, select, accept and activate one or more bid offers by quantifying the specified purchase intent through at least one central controller consisting of a central processing unit, operating system software to run the central processing unit and data storage means to identify at least buyer devices, seller devices and transaction attributes.

20 Claims, 22 Drawing Sheets

Website Name and Logo

I want to buy: Sony Blu-ray Player BDP-S970 UPC 027242789838 — 950

Location: Dallas, TX — 952

Acceptable token pre-payment amount: $10 or less — 954

Send me offers before: 10 AM 12/01/2011 — 996

Request Bid Offers — 960

Advertisements/ Related offers/ Product Information Et cetera — 958

FIG. 9D

SYSTEM AND METHOD FOR MANAGEMENT AND ACTIVATION OF CONDITIONAL BID OFFERS

CROSS-REFERENCE TO RELATED APPLICATIONS

This application is a continuation of PCT patent application serial number PCT/IB 2013/051926, titled "SYSTEM FOR MANAGEMENT AND ACTIVATION OF CONDITIONAL BID OFFERS" filed on Mar. 12, 2013, the entire specification of which are hereby incorporated by reference in their entirety.

BACKGROUND OF THE INVENTION

Field of the Art

The method and system of the present invention relate to the field of communication between buyer and seller devices. More particularly the method and system of the present invention relate to the field of conditional offer calculation, processing and validation for buyer and seller devices using a secure electronic communication network.

Discussion of the State of the Art

The World Wide Web has provided a fast and convenient mechanism for sellers to reach buyers. For marketing and sales purposes, sellers offer discounts and incentives to prospective buyers to persuade them to purchase sellers' products. There are many different methods of buyer-seller transaction in use today. However, almost all of those methods are seller-controlled in the sense that seller unilaterally decides which products to discount and the discounted price. Seller also decides about the timing of the discounts, configuration of the products and in certain cases the target customer (e.g. rewards program members, customers on a mailing list etc.) as well.

Some other existing methods from the prior art allow buyers to get a lower price or a better deal from the sellers by requiring the buyer to bid for the product or submit a conditional purchase offer. See for example, U.S. Pat. No. 7,702,540 entitled "Computer-implemented method and system for conducting auctions on the internet", U.S. Pat. No. 6,012,045 entitled "Computer-based electronic bid, auction and sale system" and U.S. Pat. No. 5,794,207 entitled "Method and apparatus for a cryptographically assisted commercial network system designed to facilitate buyer-driven conditional purchase offers" and others.

Some websites (e.g. EBay.com™, UBid.com™) allow a buyer to bid on products that are sold in an open auction on the Internet. Some other websites (e.g. Priceline.com™ Travelocity.com™) allow buyers to bid and enter into a binding contract based on a predetermined price or a "buyer-specified" conditional purchase offer but without revealing sellers identity. Buyer pays the full price for the transaction before the exact details about the transaction and the seller are disclosed to the buyer.

One problem with these methods is that buyer does not know beforehand which seller (if any) will eventually accept the price and agree to deliver the product. Another problem is that buyer has to make the full payment for the transaction while knowing only the generic attributes of the transaction (e.g. a 4-star hotel in downtown Chicago, Ill., USA) but not the specific attributes (e.g. Swissotel™ at 323 E. Wacker Drive, Chicago, Ill., USA). Still another problem of these methods is that a seller has to either accept the price offered by the buyer or reject the buyer's offer.

Buyer-driven bid offers and conditional purchase offers are also not very substantive. Other problems with such methods are: (1) a buyer may not have a good idea about the market price of the product itself (2) a buyer will always try to bid much lower price to get the best possible deal. But such price may not be appealing for the seller or if a seller accepts that low price then seller might have some quality issues (e.g. a room in a 3-star hotel with ongoing renovation work) which force the seller to sell the product at the buyer-specified extremely low price. The result of such a transaction is that most of the time buyer is not satisfied with the product quality and seller is not satisfied with the price it received. (3) buyer may not know the final purchase amount at the onset of a transaction (e.g. a restaurant bill depends on the choice of ordered entrees, spending at a department store depends on the purchased items etc.) (4) in some circumstances buyer may want to spread out the purchase over a period or may want to make multiple purchases in a short period of time (e.g. lawn mowing services, house cleaning services or day care service for a child). In such instances buyer might want to negotiate the price only once but pay the agreed upon price each time the product is delivered during a set duration.

Unsolicited seller offers constitute another mechanism for sellers to reach potential buyers. Sellers use conventional marketing methods to reach the customer such as sending catalogs, flyers, classified advertisements, coupons, e-coupons or telemarketing to attract buyers. All of these methods do not identify the target buyer and buyer's needs in a precise manner. Because seller does not know the exact need of the potential buyer in advance, it has to provide an "umbrella" offer that can be applied to multiple products of the seller in order to cater to the diversified needs of the potential buyers. However, In this case buyer has no control over which product will be discounted and by which seller. At the same time seller sees the demand in bursts. These problems make seller initiated unsolicited offers costly and less effective for sellers.

Buyers are able to do a lot more comparison shopping easily on the Internet. While sellers try to match their prices to competitors' prices, sellers still don't provide the best possible offer openly to the buyer for the same reason. Even the best offer of the seller will be competed away if it is freely available for their competitors to see on the internet. Also there is no way for a seller to be certain about a buyer's intention of buying the product from that particular seller.

Hence, there exists a need for a method and system that allows the buyers to solicit bid offers from multiple sellers for the product that they need and when they need it. Buyers also want to purchase the product from either the sellers they already know or the sellers who are authentic and/or have received good customer reviews. If before making the actual purchase a buyer can convince such a seller that the buyer is a legitimate entity, has sufficient means to pay for the product and is serious about buying the product from that seller then the buyer can get a better pricing and/or deal terms including discount and/or incentives from the seller who is equally serious about selling the product soon. At the same time sellers can better utilize a system that matches their bid offers more closely with the needs of the buyers if seller can make sure that buyer is legitimate, has a good purchase history in the past and is serious about buying the product in the near future. Sellers bid offer response may contain discounts and/or incentives that may be customized based on a buyer's direct requirements for the purpose of effectuating a commercial transaction. Such a commercial system should not require the buyer to pay full transaction price upfront before the final transaction while at the same time sellers have an incentive for customizing the offer to buyer's need to provide a competitive and compelling offer to the buyer by evaluating a buyer's purchase intent. The system ensures the legitimacy of the buyer and seller by storing their profile with certain attributes (e.g. payment cards, bank accounts, purchase history, customer reviews etc.) and also rank their attributes for the purpose of a transaction. Such a system provides a secure and confidential environment to both buyers and sellers using electronic communication so that buyers can reach to potential sellers by quantifying their intent to purchase and sellers can reach buyers with a defined purchase-intent.

The applicant is unaware of the existence of any such buyer-seller electronic communication based secure interaction system which contains the above features and addresses the above described shortcomings in the prior art. More specifically, there is no such computer-based system and method known in the prior art that allows buyers to solicit bid offers from multiple sellers using a mechanism to quantify the buyer's and seller's intent for a purchase transaction combined with a binding purchase agreement for the purpose of a commercial transaction based on the buyer's requirements.

SUMMARY OF THE INVENTION

Accordingly, the inventor has conceived and reduced to practice, in a preferred embodiment of the invention, a computer-based method and system for a secure and confidential interaction between a plurality of buyer and seller devices so that buyers can solicit competitive and compelling bid offers from multiple sellers for a desired product and sellers can provide the buyers bid offers containing a specific but customizable condition for activating the bid offer. Another objective of the present invention is to provide a method to the seller devices that enables them to send highly competitive and customized bid offer to a buyer by establishing a mechanism to quantify buyer's purchase intent as a condition for activating the bid offer to engage in a final purchase transaction for the given product at a future date and time.

The present invention introduces novel method and system for buyers to submit a request for bid offers for a product to multiple seller devices, sellers to identify and select one or more such bid offer requests for submitting a bid offer response, seller to provide conditional bid offer responses to the buyer in a secure and confidential manner wherein activation of the bid offer is conditional upon the buyer quantifying the purchase intent to initiate a transaction but without necessarily requiring the full payment for the transaction from the buyer at the transaction initiation, buyers and sellers to agree on mutually quantified purchase intent criterion and buyers to accept and activate one or more such bid offers as received from the seller devices by satisfying the embedded purchase intent condition. The present invention thus provides a buyer the ability to solicit highly competitive bid offers for a product from multiple seller devices in a secure manner on a real-time basis using a single communication interface. Using the method and system of the present invention a buyer can also view, accept and activate the best bid offer as determined by the buyer after satisfying the embedded purchase intent quantification condition.

Additionally, this invention allows any buyer to persuade a seller to submit a competitive and compelling bid offer response for a product by quantifying his/her purchase intent in advance to complete the transaction at a predetermined time or within a predetermined period based on the conditions specified in the contractual mutual purchase agreement. At the same time this invention minimizes the upfront cost for both the buyer and the seller to initiate a transaction without consummating the complete transaction in advance.

In essence this invention allows a buyer to find an attractive offer from a seller and start a transaction with the intent of completing it at a later date and time with only a small and/or no upfront initial cost to the buyer. Buyer broadcasts the request for bid offer only once which is then modified and multicast to multiple seller devices so that buyer essentially has to communicate only with a single entity. This eliminates the need for a buyer to transmit buyer's credentials such as credit card, address information et cetera to multiple seller devices without the buyer's knowledge of which specific seller(s) buyer wants to select for a particular transaction.

In addition, the present invention does not require the exact transaction amount to be known in advance at the time of transaction initiation. Also, the purchase intent quantification as described in this invention can be practiced using monetary and/or non-monetary methods.

Since seller's bid offer is activated only after buyer's purchase intent quantification condition is satisfied, present invention provides the seller security, confidentiality and compensation for submitting the best possible bid offer response to the buyer. This invention also provides a seller significant improvement in pricing efficiency, advertising efficacy and cost efficiency, because (1) willingness of the buyer to initiate the transaction by quantifying the purchase intent in the beginning significantly increases the likelihood that buyer will convert a reasonable bid offer from the seller device into a full purchase transaction (2) seller has the opportunity to cross-sell their products once the buyer is willing to buy one product from the seller (3) generates a healthy competition among sellers for the price and quality of the product (4) allows buyers to get the best price and quality for the product from sellers (5) allows buyers to choose from which seller they want to buy the product (6) the validity period of purchase order allows sellers to predict their sales more precisely thus providing them benefits of better inventory management and cost effectiveness (7) seller can customize and optimize the bid offer by asking the central controller to filter the request based on any logical combination of other attributes of buyer's request (e.g. buyer's location, seller's location, time-of-the-day, buyer ranking as determined by the system, buyer's loyalty to seller as determined based on seller's rewards program etc.) (8) activation of the seller's offer, generation of an unique token and centralized nature of the mutual purchase agreement provide seller the benefit of not disclosing the pricing and product details to its other competitors.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIGS. 9A, 9B, 9C, 9D and 9E show examples of webpages as the interaction method between the buyer and central controller in one embodiment.

Figure 1:
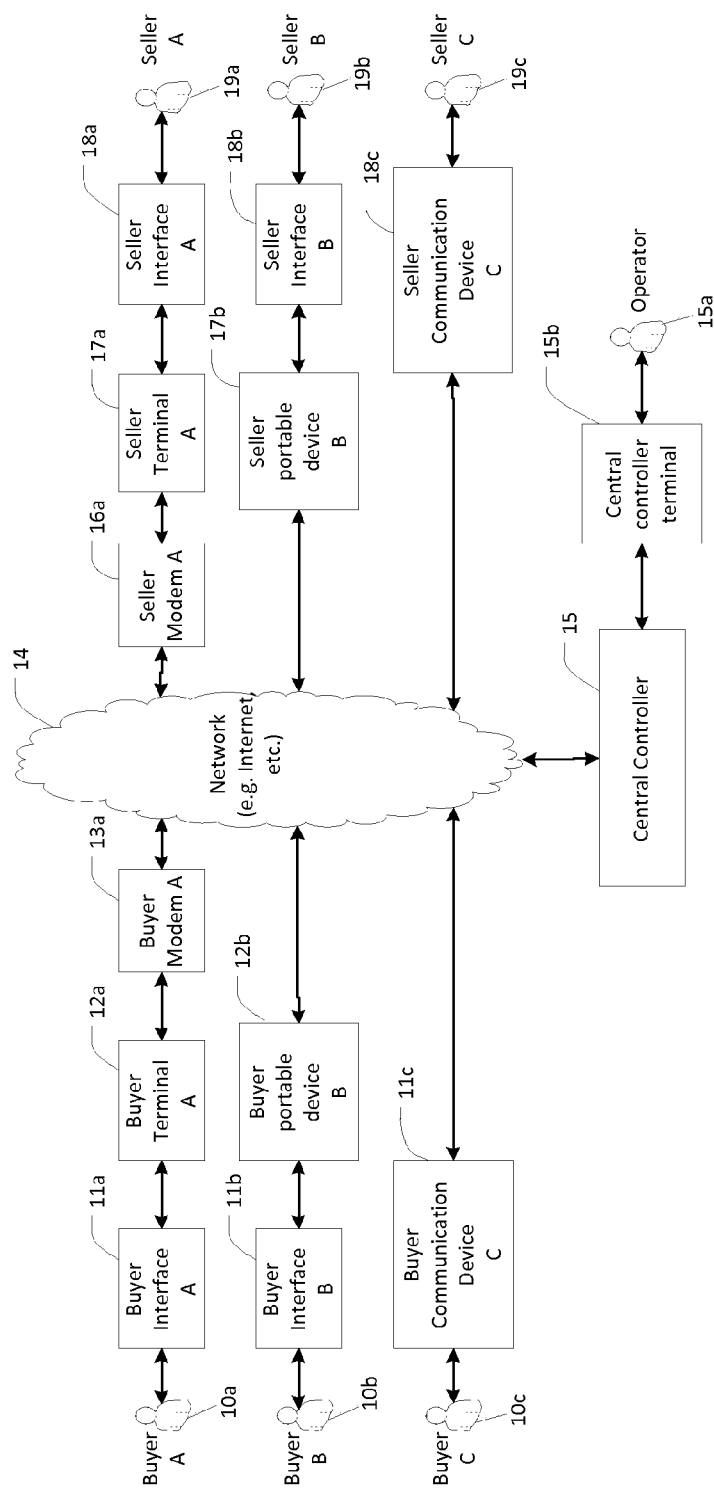
FIG. 1 shows the preferred embodiment of the overall system architecture.

The figures are described in greater detail in the next section of the patent.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein the following terms have the meaning given below:

"Product"—means either a product or a service.

"Seller"—means any entity that provides and/or sells the product to the buyer. This entity may register itself with the central controller. Upon registration, central controller will verify the entity and assign an identification code to the entity.

"Buyer"—means any entity that wants to buy and/or use the product and submits the request for bid offer to the central controller. This entity may register itself with the central controller. Upon registration, central controller will verify the entity and assign an identification code to the entity.

"Seller device"—means any computer device for a seller to interface to at least one controller. This may be, but not limited to, user terminals comprising a computer and browser can be any such device as a typical computer, WebTV et cetera that can connect to a network, a portable device be any of the various types of devices such as laptops, smartphones, PDAs or any other device capable of communicating over a network.

"Buyer device"—means any computer device for a buyer to interface to at least one controller. This may be, but not limited to, user terminals comprising a computer and browser can be any such device as a typical computer, WebTV et cetera that can connect to a network, a portable device be any of the various types of devices such as laptops, smartphones, PDAs or any other device capable of communicating over a network.

"Bid offer"—means a price quote for the product including the terms and conditions for the commercial transaction. Seller can provide the price quote either as a discount from the market price of the product or as a fix price that might be lower than the market price for the product or in any other form such as incentives et cetera. Seller can also combine multiple products in its bid so that the effective price for the product that buyer wants is lower than the current market price for the product.

"Conditional bid offer response" or "conditional offer response"—means that the bid offer contained within the bid offer response remains inactive unless certain conditions to activate the bid offer are met. Such conditions are required for the buyer to quantify the purchase intent to engage in a commercial transaction and may include a specific token pre-payment amount required to activate the offer, validity period of the offer, location where transaction can take place etc.

"Purchase intent quantification"—means a deterministic, quantifiable and verifiable action of the buyer that demonstrates to the seller that buyer is interested in purchasing the product and is making a full-faith commitment to complete the transaction as per the conditions described in the bid offer. One example of such action is agreeing to pay a specific token deposit amount to the seller. Another example of such action is to measure the location proximity of the buyer to the seller as a function of time and determine if buyer's location coordinates are approaching seller's location coordinates.

"Activation response" means a response from, for example, a buyer device, whereby a purchase intent of a conditional offer may be quantified thereby at least activating a corresponding offer of a conditional offer response.

"Token pre-purchase"—means a symbolic purchase by the buyer whereby buyer enters into a purchase agreement to buy the product from the seller within a future period by making a fractional purchase transaction in order to initiate the transaction.

"Token pre-payment"—means a payment signifying a good-faith token purchase of the product before actual purchase transaction takes place. It can be treated as a security deposit for the purpose of future purchase transaction. This payment amount can be any fraction of the actual product price as described in the bid offer.

"Secure redemption token" or "Token"—means an identifier or code that is generated after validating that the buyer has satisfied the purchase intent quantification condition embedded in the conditional bid offer response. Such a code satisfies the necessary and sufficient condition for identifying a purchase transaction through the central controller. Token also identifies the terms and conditions of the transaction as set forth in the conditional bid offer. Such conditions may include the validity period for the token, location of the transaction, purchase quantity etc.

"Central controller" or "Controller"—means, in a preferred embodiment, an entity comprising a network-connected controller computer comprising at least a processor and a storage device further comprising a program stored in the storage device and operating on the processor, the program adapted to implement a system and method for managing interaction between a plurality of buyer devices and a plurality of seller devices. This entity, in a preferred embodiment, may have manual and/or automated operation using a computer system and/or web server. Such an entity may also be a single entity or a distributed entity as deemed fit by a particular embodiment.

DETAILED DESCRIPTION OF EXEMPLARY EMBODIMENTS

This invention may involve novel methods, system, message formats, and data structures for a buyer-initiated bid offer request and response management system. The following description is presented to enable one skilled in the art to make and use the invention, and is provided in the context of particular applications and their requirements. Various modifications to the disclosed embodiment will be apparent to those skilled in the art, and the general principals set forth below may be applied to other embodiments and applications. Thus, the present invention is not intended to be limited to the embodiments shown and the inventor regards this invention as any patentable subject matter described herein.

A preferred embodiment of the invention consists of a central controller that connects the buyer devices to the seller devices. In the preferred embodiment of this invention buyers and seller devices communicate with the central controller using an electronic network.

An overall diagram of one exemplary embodiment of the invention is shown in FIG. 1. In general the system architecture connects buyer devices 12 with seller devices 17 by means of central controller 15. Buyers 10 are designated 10a to 10c and are collectively referred to as buyers 10. Sellers 19 are designated 19a to 19c and are collectively referred as sellers 19. Buyers and sellers connect to the central controller 15 via a network 14. There can be many buyers 10 and many sellers 19; however, the actual number of buyers 10 and sellers 19 is not relevant so long as there is at least one buyer 10a and one seller 19a. Buyers 10 and sellers 19 may use different online and offline communication interfaces to communicate with central controller 15. Typically, but not necessarily, communication is handled via a network, for example, the Internet.

Buyer and seller terminal 12a, 17a may be any such device as a typical computer, WebTV, et cetera, that can connect to the modem 13a, 16a respectively to access a network, for example, the Internet. Buyer 10a connects to the central controller 15 via a webpage interface 11a and seller 19a connects to the central controller via a webpage interface 18a. Webpage 11a is loaded on terminal 12a and webpage 18a is loaded on terminal 17a using applications such as Microsoft™ Internet Explorer, Mozilla™ Firefox, Apple™ Safari, Google™ Chrome etc. Webpage interface 11a and 18a may use hypertext transfer protocol secure (HTTPS), secure file transfer protocol (SFTP) et cetera to communicate with controller 15 using secure message transmission. The connection between buyer or seller terminal client and central controller server may be a secured connection using Transport Layer Security (TLS), Secure Socket Layer (SSL) or any other such cryptographic protocol that provides communication security over a network, for example, the internet.

Central controller 15 may also connected to the internet via an ISP. Similarly buyer and seller portable electronic device 12b, 17b may be any of the various types of devices such as laptops, smartphones, PDAs or any other device capable of communicating over a network, for example, the internet. Buyer 10b and seller 19b connect to the central controller through the interface 11b and 18b respectively. Interface 11b and 18b can be a dedicated application such as an iOS™, Android™, Windows™ or any other processor operating system based application running on portable electronic devices 12b and 17b. Still another type of buyer 10c and seller 19c communicate directly with central controller 15 using a communication device 11c and 18c respectively. Devices 11c and 18c can be a phone, a facsimile machine or any such device that is able to communicate electronically, for example, wireless mobile networks, PSTN (Public switched telephone network), ISDN (Integrated services digital network), satellite or other like electronic communication channels.

Buyer, seller and/or controller can communicate by sending and receiving a byte stream over the electronic communication channel using, for example, Transmission Control Protocol (TCP) and/or User Datagram Protocol (UDP) over Internet Protocol (IP), etc. Such electronic communication channel may consist of a wired connection, for example, using a telephone line, Digital Subscriber Line (DSL), Wireless (using 802.11a/b/g or WiMAX etc.), cellular (Code Division Multiple Access 'CDMA' or General Packet Radio Service 'GPRS etc.), or any other like communication channel.

The system operator 15a utilizes a conventional client terminal 15b to access and configure the system's controller 15 as is conventional with a computer system and a network server.

Although not shown in FIG. 1, buyer and seller entities can also communicate with central controller using, for example, SMS (Short Message Service), MMS (Multimedia Message Service), postal mail, electronic mail, facsimile and/or other such offline communication channels. System operator 15a can enter the buyer and server messages received through offline communication such as postal mail directly into the central controller 15 through the client terminal 15b. The lines in FIG. 1 therefore represent logical information flow and not the physical connections.

Figure 2:
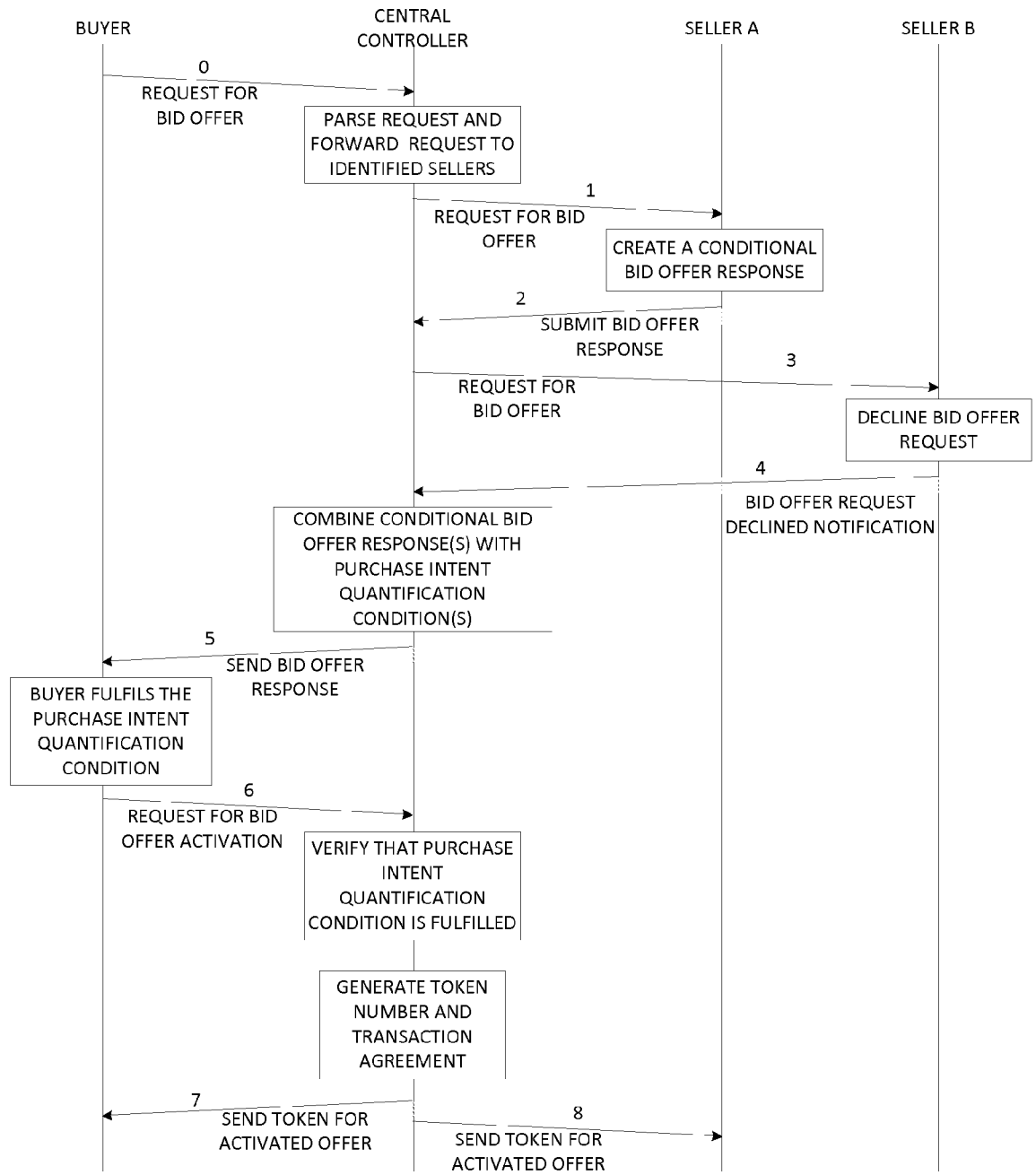
FIG. 2 shows message and event timing sequence initiated by a buyer's bid offer request in one embodiment.

FIG. 2 with continued reference to FIG. 1 shows the sequence of messages and events that take place among the buyer, central controller and seller(s) in one embodiment. The messages are numbered 0 to 8 in FIG. 2. First, buyer 10a decides which product he or she wants to request the bid offers for. Buyer 10a then sends a bid offer request to central controller 15 (message 0). Buyer 10a may describe the product using, for example, a standardized description with the help of UPC (Universal Product Code), EAN (International Article Number), QR (Quick Response) Codes and/or any other such mechanism. Bid offer request from buyer 10a may also include the desired quantity of the product if applicable. Buyer 10a may also provide a textual product description or use any other mechanism for product description so that sellers are able to understand and thus provide a bid offer for the product and/or the closest substitute of the product using the methods of present invention. Buyer 10a may also select a product from a pre-existing list of products as provided by one or more seller devices.

Central controller 15 then parses the buyer 10a's bid offer request to extract the product keywords based on the product description mechanism used by buyer 10a. E.g. central controller 15 searches the online UPC database to find product details if buyer 10a provided a UPC number in the bid offer request. Central controller 15 forwards the said bid offer request to those sellers 19 who subscribe to keywords in the product description as extracted from the parsed request (messages 1 and 3). One or more sellers 19 may submit their initially inactive bid offer responses for an exact or closely matching product. The bid offer response contains, for example, either a price discount from the market established price and/or the quoted price for the product in the form of an exact price that the seller is willing to accept for the product from the said buyer (message 2). Sellers may also reject the bid offer request (message 4) if they don't want to provide a response.

In preferred embodiment, bid offer responses received from seller devices 18 require quantification of purchase intent from buyer 10a as, for example, a condition for activating the bid offer. Central controller 15 presents the initially inactive bid offer responses to the buyer for review and selection purposes (message 5). The seller's offer is available for buyer 10a to see but it is only activated after buyer 10a agrees to accept the offer and fulfills the purchase intent quantification condition associated with seller 19a's bid offer response (message 6).

The preferred embodiment of the present invention provides the purchase intent quantification for the buyer and seller by establishing a "token pre-payment" based bid offer activation system. "Token pre-payment" is a monetary amount as determined based, for example, upon certain attributes of the transaction. Token pre-payment requires buyer 10a to make a payment at the beginning to generate a unique redemption token code, also, herein referred as a token, and activate the seller 19a's offer.

Once buyer 10a accepts a seller's offer and pays the pre-payment amount required for purchase intent quantification, central controller 15 validates the amount of pre-payment and generates a unique redemption token number, herein referred to as the "token code", for the buyer and seller pair and provides it to the buyer 10a and the seller 19. In some embodiments, central controller 15 may also create a binding purchase agreement between buyer 10 and seller 19a for a future purchase transaction according to, for example, terms specified in the original bid offer. Accordingly, this purchase agreement may be associated with the token code as generated by central controller 15 (messages 7 and 8).

In a preferred embodiment, central controller 15 may keep the pre-payment proceeds in an escrow account to be delivered later to seller 19a on, for example, buyer 10a's behalf. This token money may provide compensation to the seller in the event buyer does not complete the purchase transaction for the product within, for example, a time period specified in a mutually accepted contractual purchase agreement associated with the token. In a preferred embodiment, the "token" remains active, example, for a predetermined period or until the final purchase transaction is consummated. In this regard, once the transaction validity period has expired or the purchase transaction is complete, controller 15 may deducts a commission and/or fee and sends any remaining money from the escrow account to the seller. In some embodiments, central controller 15 may also charge a subscription fee and/or a per transaction fee from either buyer 10a or seller 19a or both. In some embodiments, future purchase transaction between buyer 10a and seller 19a may take place according to, for example, terms and conditions specified in a purchase agreement. In this regard, both buyer 10a and seller 19a have the option to validate the token with central controller 15 for example, for the purpose of a final purchase transaction.

In some embodiments, the system and method may also be practiced with other methods for the purchase intent quantification between a buyer and a seller. By the way of a non-limiting example, seller may use buyer's location proximity (or movement) as an indication of the purchase intent. Controller 15 and/or seller 19a determine buyer 10a's location data as collected, for example, from the location of buyer device 12 based on, for example, Global Positioning System (GPS) information of buyer device 12 and use buyer 10's location coordinates for the purchase intent quantification.

In some embodiments, the system and method may also be used in a partial or complete off-line communication. Off-line communication may be practiced using postal mail, electronic mail, phone, text message, facsimile or another off-line tool. An example of partial off-line embodiment may include a buyer sending a postal mail to central controller 15 to request bid offer for a product. Central controller 15 may then communicate with interested sellers 19 who may be online and send their bid offer responses to central controller 15 using, for example, web interface 18a. An example of complete off-line embodiment may include a central controller who may not have any internet connectivity or web interface for buyers 10 and sellers 19; such a central controller 15 may communicate with buyers 10 and sellers 19 using, for example, only off-line communication tools.

One embodiment of this invention allows central controller 15 to derive the token pre-payment amount, for example, based on the transaction attributes. Central controller 15 may use multiple attributes (e.g. seller's ratings, buyer's purchase history data, seller's location, buyer's location, product, price, time of day, length of purchase agreement validity period and/or any other such attributes) as inputs to determine the price of token required as a pre-payment for offer activation.

In another embodiment, sellers 19 may directly determine the "token pre-payment" amount required to activate a corresponding bid offer. In this regard, sellers 19 may have direct control of ensuring that buyer 10a may be serious about purchasing a product and highly likely to complete a purchase transaction within a validity period of the "token" purchase agreement. Seller 19a may receive a monetary incentive for providing a best competitive bid offers as measured by buyer 10a's intent to activate the bid offer by making a small pre-payment.

In yet another embodiment, central controller 15 computes the system ranking for both buyer 10a and seller 19a based on, for example, a transaction history. Central controller 15 may also store preferences of buyers 10 and sellers 19 in a database. Central controller 15 may utilize the transaction history for, for example, automatically computing the token pre-payment amount required to activate a bid offer for each transaction between a selected buyer and a selected seller. Central controller 15 may also, for example, utilize this data in combination with other transaction attributes for dynamically routing bid offer requests and responses among the buyer and seller entities.

In still another embodiment of the present invention, buyer 10a may indicate to central controller 15 a willingness to also receive, for example, unsolicited bid offers from sellers 19. Central controller 15 may then decide which bid offers from the sellers 19 to send to buyer 10a based on, for example, buyer 10a's preferences and other attributes. In this regard, buyer 10a may receive attractive bid offers from sellers 19 without, for example, submitting an explicit request to central controller 15 to collect bid offers for a particular product. For example, if buyer 10a activated an earlier bid offer for an airline ticket then central controller 15 may automatically send bid offers to buyer 10a from hotels without buyer 10a explicitly requesting such bid offers.

Another embodiment of the present invention allows buyer 10a to search for, for example, existing conditional bid offers from sellers 19 based on, for example, a search criterion, review matching bid offers, accept a bid offer that satisfies buyer's criterion and activate the bid offer by making the required token pre-payment. In this regard, buyer 10a does not send an explicit request for soliciting bid offers to the central controller 15. Sellers 19 communicate bid offers to controller 15 to be stored in a database. Seller 19a may also specify, for example, a customization criterion for each offer. Such customization criterion may include, for example, attributes such as time-of-day, buyer location, buyer rank, seller load factor and any other criterion as specified by the seller. Central controller 15 may then use the customization criterion to, for example, automatically customize seller 19a's bid offer in response to a bid offer request received from buyer 10a. In this regard, central controller 15 may not forward bid offer request from buyer 10a to the seller 19a.

Still another embodiment of the present invention allows buyers 10 and sellers 19 to communicate directly wherein central controller 15 is a distributed software application running within the buyer devices 12 and seller devices 17.

In yet another embodiment, a final purchase transaction between buyer 10a and the seller 19a may be completed using central controller 15. In this scenario, central controller 15 receives a final payment from buyer 10a; the final payment is forwarded to seller 19a. Seller 19a may then, for example, provide a product to buyer 10a either by first delivering it to central controller 15 wherein central controller 15 sends it to buyer 10a or by, for example, directly delivering it to buyer 10a. In this regard, central controller 15 may play a role of an intermediary in the final purchase transaction.

Another embodiment of the present invention allows seller devices 17 to submit conditional bid offer responses for buyer 10a's bid offer request wherein if buyer 10a decides to activate the offer by making a token pre-payment, then the token can be redeemed through, for example, another seller 19b. In this regard, this embodiment allows sellers 19 who are, for example, original equipment manufacturers (OEMs) to, for example, directly submit bid responses to buyer 10a where buyer 10a can redeem an activated token at, for example, a retailer for the OEM.

In yet another embodiment of the present invention, central controller 15 presents one or more bid offers from sellers 19 to buyer 10a in the form of, for example, a price range or discount range without, for example, showing the exact price or the exact discount respectively. Buyer 10a then accepts a particular seller 19b's bid offer and makes the required token pre-payment whereupon central controller 15 shows, for example, the associated exact discount, price and/or incentives of the selected bid offer from seller 19b.

In still another embodiment, in a bid offer request buyer 10a also specifies, for example, a maximum token pre-payment amount that buyer 10a is willing to pay for activating a bid offer from seller 19a. Controller 15 communicates this information to seller 19a along with the bid offer request. Sellers 19 and/or controller 15 may then use this information to derive a discount and/or incentive value for a plurality of bid offer responses that may be presented to buyer 10a.

Example 1

Figure 3:
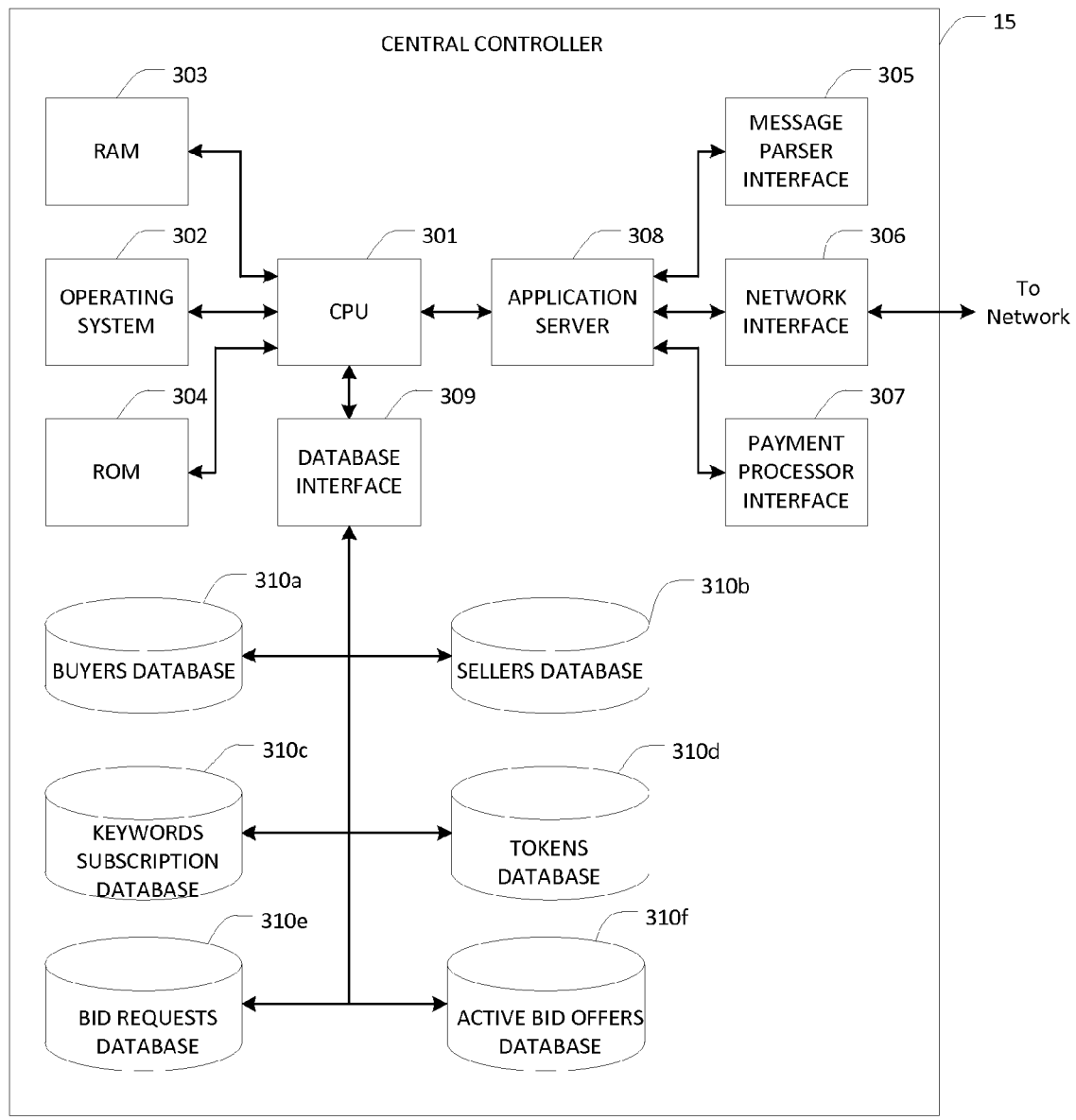
FIG. 3 is a block diagram showing one embodiment of the central controller.

A typical central controller 15, as shown in FIG. 3, can be a high-speed computer containing a central processing unit ("CPU") 301, operating system 302, RAM 303, ROM 304, application server 308, and database interface 309. CPU 301 may be a 3.2 GHz Intel Core i7 microprocessor manufactured by, for example, Intel™ Inc. Application server 208 can be a Java™ Application Server using Java™ Platform, Enterprise Edition or .NET™ Server developed by Microsoft™. Application server runs a customized software application for processing and handling of bid offer requests, responses and transaction messages in the present invention using a software-based message interface 305, network interface 306 and payment processing interface 307.

Database interface 309 may use Database Management System (DBMS) manufactured by, for example, Teradata™ or Oracle Corp™. to access the database storage 310a to 310f. Data storage devices 310a to 310f may contain databases used in the processing of bid offer requests, responses and transaction messages of various embodiments of the present invention.

Buyers database 310a may contain data attributes for buyer accounts such as buyer's location, shipping address, payment information, rank within the system, buyer identifier etc.

Sellers database 310b may contain data attributes for seller accounts such as seller's location, number of branches, payment account, rank within the system, seller identifier etc.

Keywords subscription database 310c may contain information about the keyword subscription for each seller account.

Figure 4:
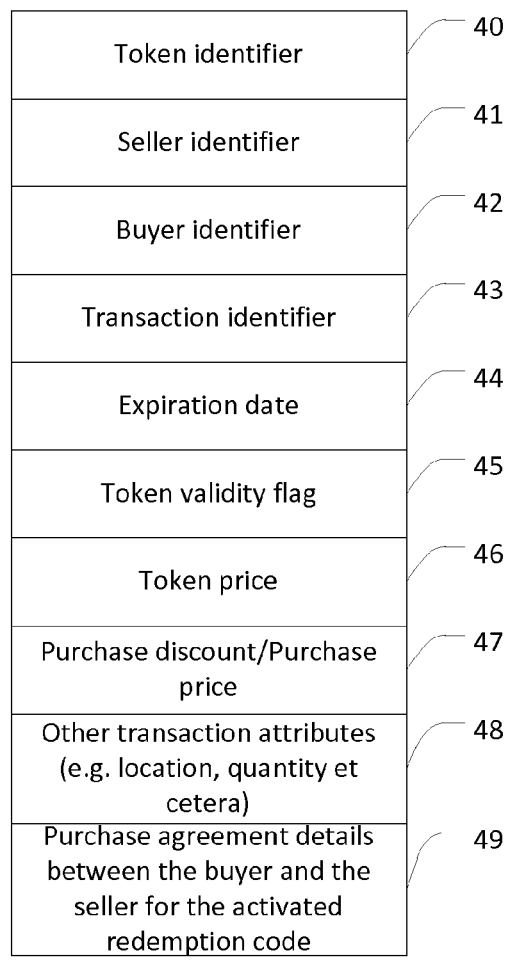
FIG. 4 illustrates exemplary data structure of a redemption token in one embodiment.

Tokens database 310d may contain attributes for all system generated redemption token codes such as associated purchase intent quantification condition, buyer identifier, seller identifier, product description, validity period, detailed final purchase agreement, etc. FIG. 4 shows attributes of a redemption token as stored in the tokens database.

Figure 5:
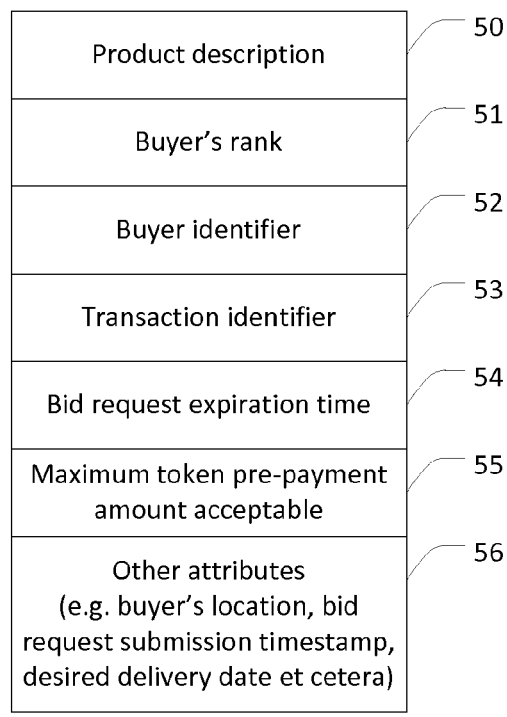
FIG. 5 illustrates exemplary information elements of a bid offer request message in one embodiment.

Bid requests database 310e may contain bid requests as submitted by the buyers with fields such as desired product description, seller criterion, validity period, location etc. FIG. 5 shows attributes of a bid offer request as stored in the database.

Figure 6:
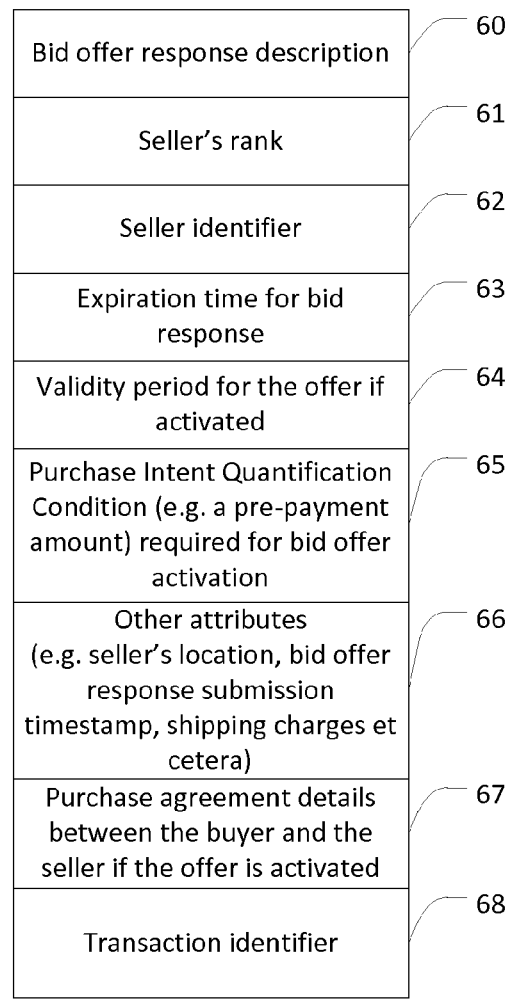
FIG. 6 illustrates exemplary information elements of a bid offer response message in one embodiment.

Active bid offers database 310f may contain offers submitted by sellers that can be customized for the purchase intent quantification by central controller 15 including fields such as pre-payment amount required, buyer criterion etc. Central controller 15 may send these bid offers to buyer 10a. FIG. 6 shows one example of the attributes of a bid offer response message as used by the central controller.

While some embodiments may describe the central controller 15 as a single computer, those skilled in the art will realize that the functionality can be distributed over a plurality of controller computers. As such some application server software components may reside within buyer and/or seller terminals 12a, 17a or devices 12b, 17b et cetera.

FIG. 4 shows by the way of a non-limiting example the schematic of the redemption token as generated by central controller 15. Redemption token contains multiple attribute fields which are populated by central controller 15. Field 40 is the unique token identifier that may be used by central controller 15 as a necessary and sufficient condition to identify a token contained in the redemption tokens database as a valid token at any point in time. Field 41 is a seller identifier that uniquely identifies an associated seller in the system for token redemption. Field 42 is a buyer identifier that uniquely identifies an associated buyer in the system of FIG. 4 as the valid token holder. Field 43 is a transaction identifier created by the system of FIG. 4 for a particular transaction between buyer 10a and a seller 19a. Field 44 is an expiration date for the token as determined by central controller 15 based on the attributes of the bid offer. Field 45 is an identifier variable that determines if the token is valid or not valid. Field 46 denotes a token price which may also be a pre-purchase amount required to, for example, activate the bid offer from a particular seller 19. Field 47 contains price details of an actual purchase transaction. By the way of a non-limiting example such price details may be represented as, for example, 40% off from the retail price of the product or $100 for a product. Field 48 is a placeholder field for other attributes of the transaction as described in the original bid offer received from seller 19a and as activated by buyer 10a. Field 49 contains purchase agreement details in, for example, text format. Such attributes may be including, but not limited to, the location of the transaction, quantity allowed for purchase etc. A redemption token may also contain a subset of these fields or additional fields as may be determined appropriate within a particular embodiment.

Figure 8A:
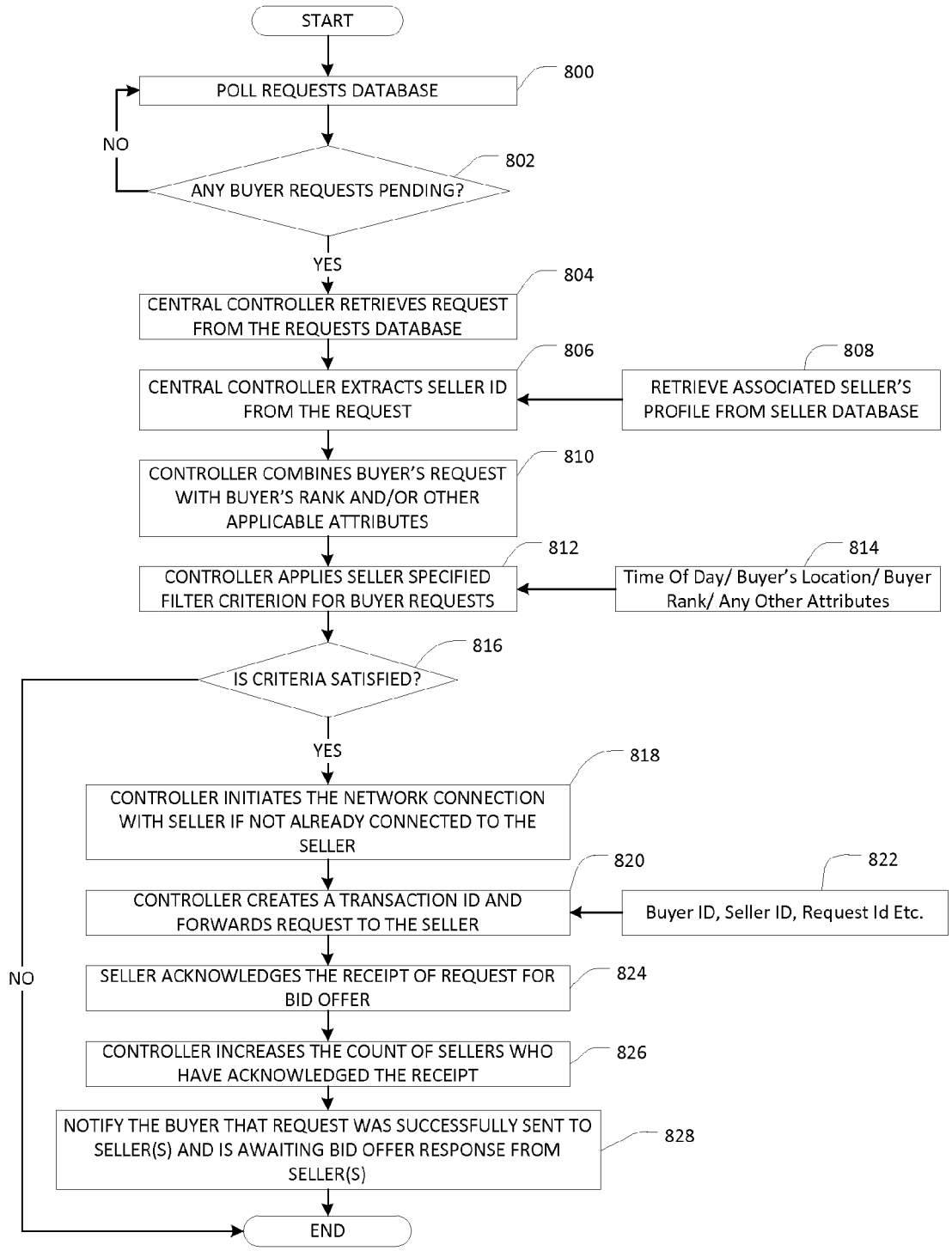
FIGS. 8A and 8B show the flow diagram of one embodiment of central controller forwarding the bid offer request to seller devices.

FIG. 5 shows attributes included in a bid offer request message that may be sent by controller 15 to selected sellers 19 in step 820 of the process as described in FIG. 8A. Field 50 in FIG. 5 is a text field containing a product description, Field 51 is a numerical field representing buyer 10a's rank in the system, field 52 is an alphanumerical field containing buyer 10a's identifier. Field 53 is, an alphanumeric field containing transaction identifier. Field 54 is a numeric field representing the expiration time for the bid offer request as entered by the buyer. Field 55 is an optional numeric field containing the maximum amount buyer 10$a$ is willing to pay for a purchase intent quantification. Field 56 is an alphanumeric field containing other attributes such as buyer's location, bid request submission time at cetera. The attributes included in the forwarded bid request message are shown as an example only and other such attributes can be used in another embodiment of the present invention.

Figure 7:
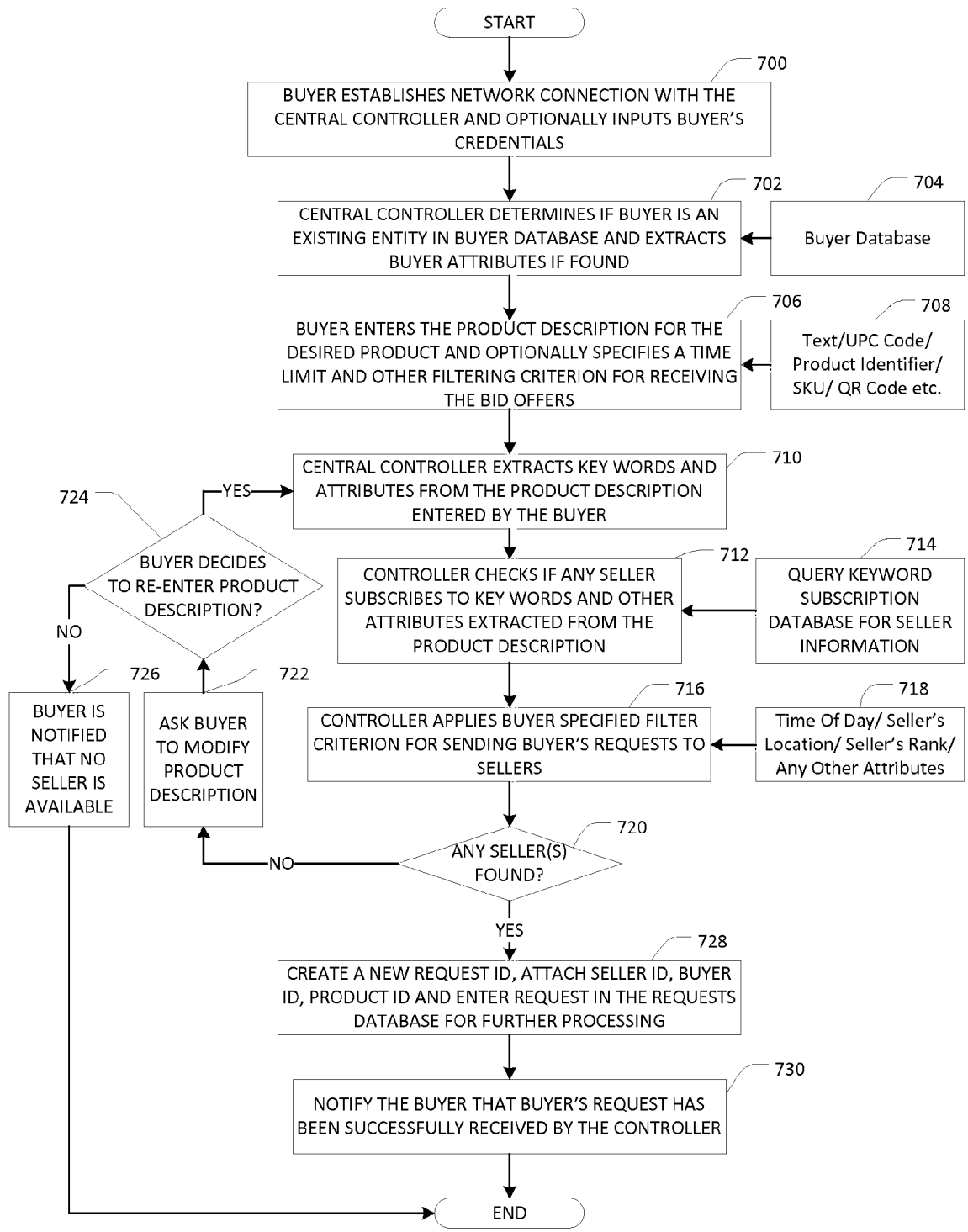
FIG. 7 shows the flow diagram of how a buyer submits a bid offer request to the central controller in one embodiment.

In one embodiment, buyer 10$a$ may specify filtering criteria that may include a maximum pre-payment amount that may be required for a bid offer activation, and that may be acceptable to the buyer in Step 706 of FIG. 7. In this regard, when buyer 10$a$ forwards the bid offer request message to seller devices 17 then this information may also be included in the message in the optional alphanumeric Field 54 of FIG. 5. In this regard, seller 17$a$ and/or central controller 15 may determine an amount of discount and/or offered to the buyer based on the maximum pre-payment amount acceptable to the buyer.

Figure 10:
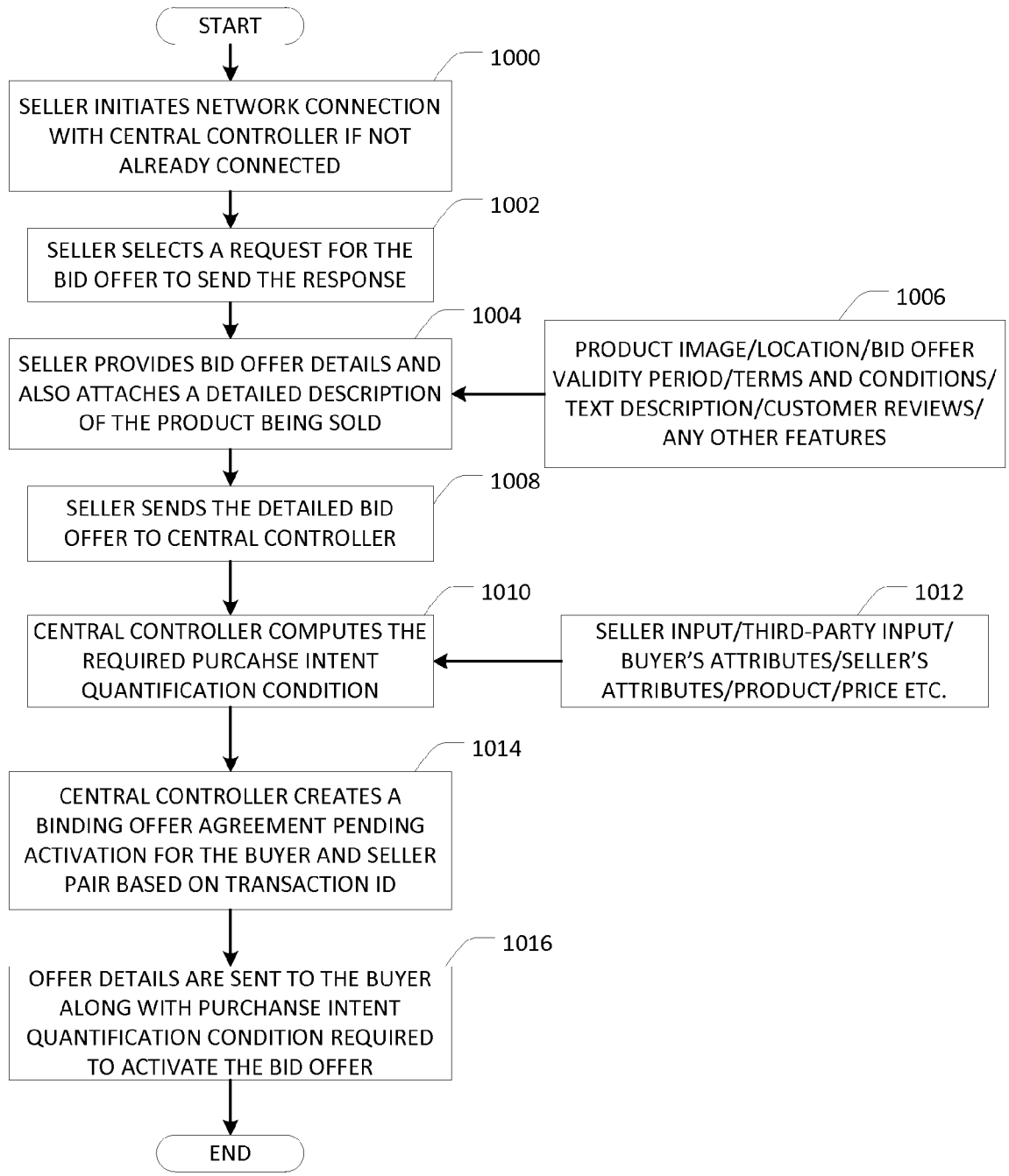
FIG. 10 shows the flow diagram of one embodiment of the interaction between a seller and central controller for submitting a bid offer response.

FIG. 6 shows attributes included in a bid offer response message that may be sent by seller 17$a$ to controller 15 in the Step 1008 of the process as described in FIG. 10. Field 60 in FIG. 6 is a text field containing a description of the bid offer response, Field 61 is a numerical field representing a seller's rank in the system, Field 62 is an alphanumerical field containing seller 17$a$'s identifier and Field 63 is a numeric field representing the expiration time for the bid offer response as entered by the seller. Field 64 is a numeric field that indicates the validity period of a redemption token code if buyer activates the offer where the redemption token code is generated by the controller. Field 65 is an alphanumeric field representing a purchase intent quantification condition for a bid offer activation such as a token pre-purchase amount required as computed by central controller 15 in the Step 1010 of FIG. 10. Field 66 is an alphanumeric field containing other attributes such as seller's location, bid response submission time, et cetera. Field 67 is a text field containing a detailed purchase agreement with terms and conditions for a final purchase transaction between buyer 10$a$ and the seller 17$a$. Attributes included in a forwarded bid request message are shown as an example only and other such attributes may be used in another embodiment of the present invention. Field 68 is an alphanumeric field containing the transaction identifier.

FIG. 4, FIG. 5 and FIG. 6 describe attributes of a typical redemption token code, bid offer request and bid offer response message respectively, as used in one embodiment of the present invention. However, other embodiments of the present invention may use different such attributes and messages.

FIG. 7 represents a flowchart for a buyer submitting a bid offer request for a product to central controller 15. Process starts when buyer 10$a$ establishes a connection with a web server running at the central controller 15. In Step 700 buyer 10$a$ starts a web program such as Internet Explorer™, Netscape™ Navigator, Firefox™, Google™ Chrome, Apple™ Safari, etc. and accesses the web server of central controller 15. Buyer 10$a$ may also enter login and password information to identify herself. Central controller 15 may perform buyer 10$a$'s identity authentication in Step 702 by accessing buyer 10$a$ database as indicated in block 704. If buyer 10$a$ already exists in a buyer-database then buyer 10$a$'s attributes are retrieved from the database. In Step 706 buyer 10$a$ submits a request for bid offers by describing a product in detail using product keywords, for example, plain text, UPC (Universal Product Code), EAN (International Article Number), a combination thereof or any other method to identify the product as shown in block 708.

FIGS. 9A, 9B, 9C, 9D and 9E show an example of buyer 10$a$'s webpage interface as described in 11$a$ in FIG. 1. These webpages constitute an interaction method between buyer 10$a$ and central controller 15. FIGS. 9A through 9E show relevant fields for interactions described in steps of FIG. 7, FIG. 8A, FIG. 8B and FIG. 12 as explained in the following description. However, FIGS. 9A through 9E are only examples of the webpages describing fields relevant to one embodiment of the present invention. In reality webpages of FIGS. 9A through 9E may be designed with more creativity and may contain other information fields, such as, advertisements, product news and reviews, sellers' reviews and rankings etc. Also, webpages are used as one example of communication between buyer 10$a$ and controller 15. Buyer 10$a$ may also communicate with controller using, for example, SMS (Short Message Service) and/or MMS (Multimedia Message Service) where message parser interface 305 of central controller 15 parses messages and enters a request in bid requests database 310$e$ of FIG. 3.

Figure 9A:
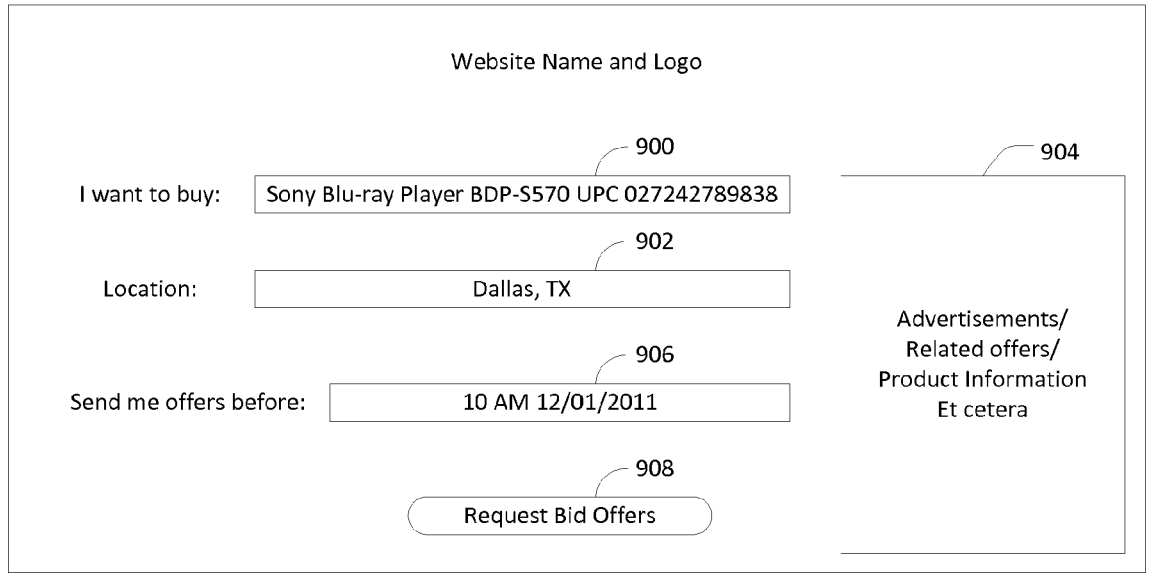

Referring back to FIG. 7, in Step 706 buyer 10$a$ enters information about a product using keywords, for example, simple text describing the desired product precisely. FIG. 9A shows one such example of a webpage containing an editable text field 900 for entering a product description, field 902 for location information, field 906 for bid offer submission deadline and a request button 908. For example buyer 10$a$ might choose to input "Sony™ Blu-ray Player BDP-S570 UPC 027242789838" in field 900 for product description, "Dallas, Tex." in field 902 for location and "12/01/2011" in field 906 for bid offer submission deadline.

FIG. 9D shows one embodiment where in Field 954 buyer 10$a$ specifies an activation price that buyer 10$a$ may be willing to pay within a bid offer request. In this regard, controller 15 may include buyer 10$a$ specified limit for activation price in a bid offer request message that is forwarded to seller devices 17. Sellers 19 and/or central controller 15 may then use this information to compute an appropriate discount and/or incentives to offer to buyer 10$a$ based on a token pre-payment amount limit specified by buyer 10$a$.

Figure 9B:
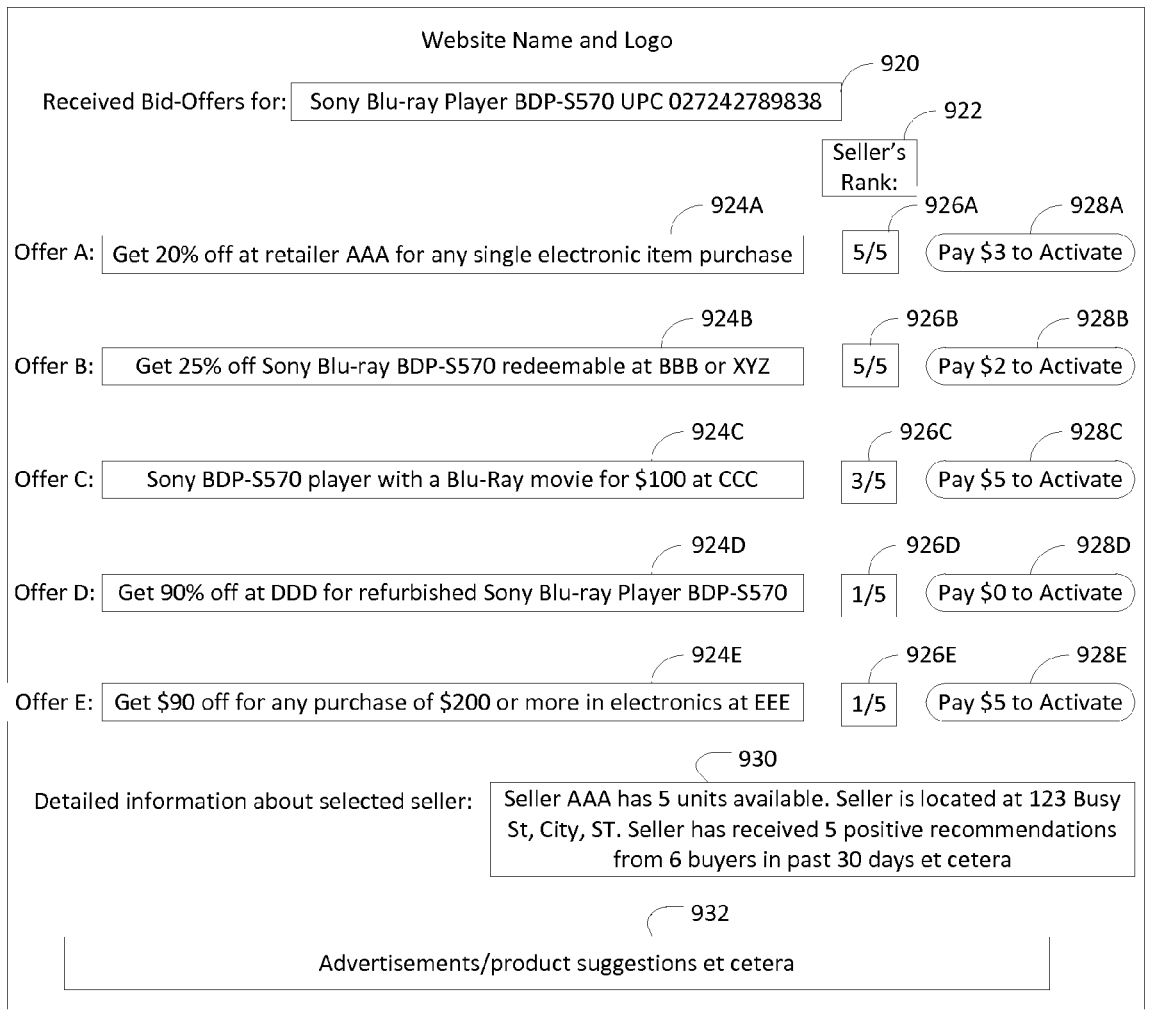
Figure 9C:
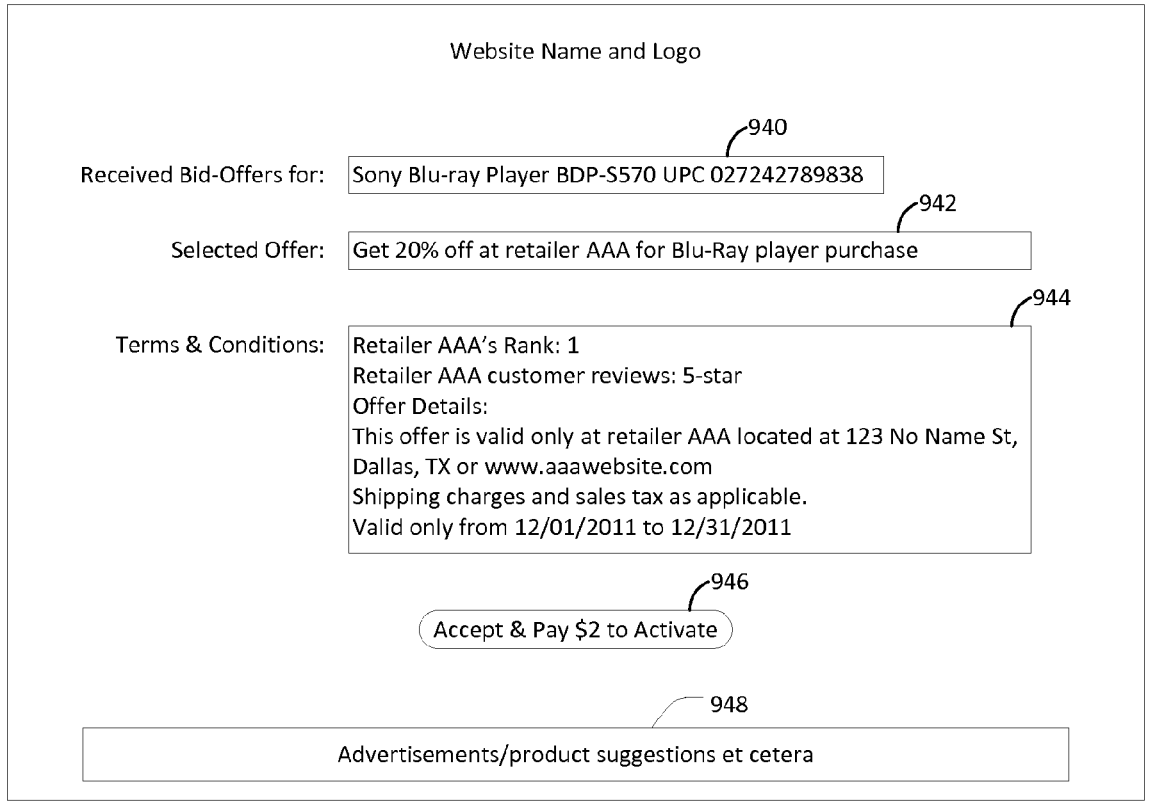
Figure 9E:
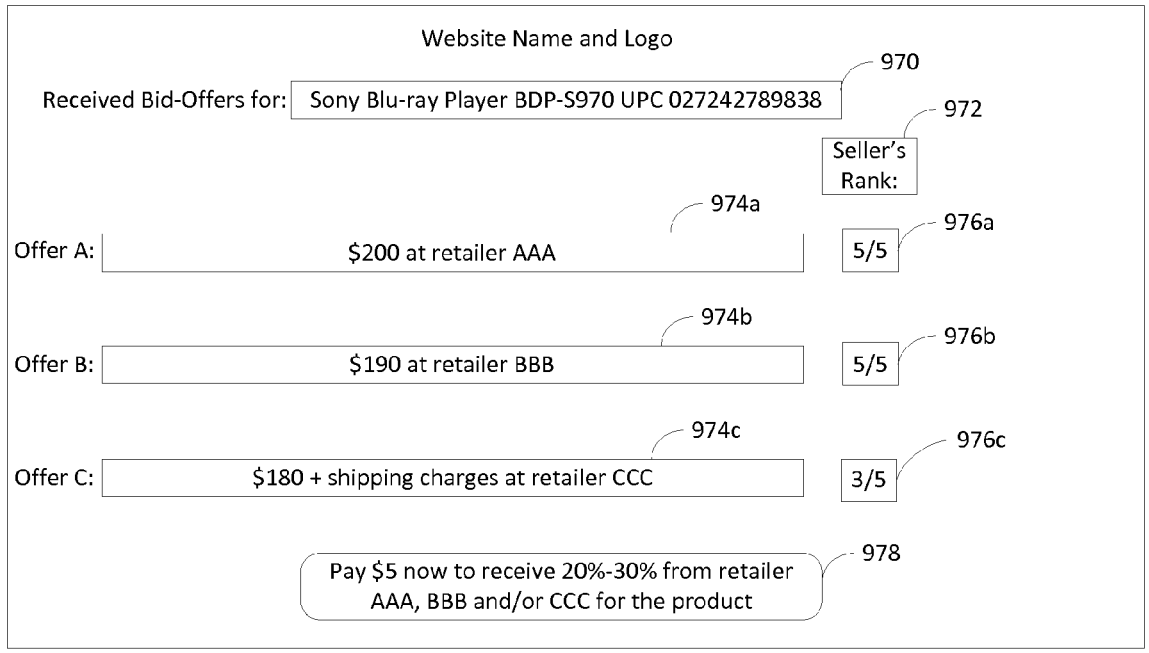

FIG. 9E shows one embodiment where a bid response from seller 19$a$ is presented to buyer 10$a$ in the form of, for example, a range of discounts or range of prices before activation by buyer 10$a$. Fields 974$a$, 974$b$ and 974$c$ show an example of a price being offered by sellers 19. Field 978 shows a range of discount for an exact discount that will be available to buyer 10$a$ if buyer 10$a$ decides to activate an offer from any of listed sellers 19 for offer A, B and C. The number of sellers 19, prices, discounts and other attributes are shown here for exemplary purposes only. It can appreciated by one with ordinary skill in the art that other embodiments may use different range-bound attributes that contain an exact value of price or discount attribute that may be available to buyer 10$a$ when buyer 10$a$ activates a bid offer by paying a required token pre-payment amount.

Referring back to FIG. 7, in Step 710 central controller 15 extracts keyword information from a text description as entered by buyer 10$a$ in the previous step. In Step 710 central controller 15 parses buyer 10$a$'s request string and applies a mechanism to extract keywords as follows.

A simple keyword extraction method retains all words excluding common pronouns and verbs such as: "I", "We", "is", "are" etc. Any 12-digit or 13-digit numbers is product description as entered by buyer 10$a$ may be used to search, for example, a UPC database to determine a product specification. Product category may be determined based on a keywords database that associates product keywords to product categories such as "TV" and "Television" may be associated with "Electronics", "Wine" may be associated with both "Restaurant" and "Grocery". However, this is just an example as used in one embodiment and many other complex methods may be used to extract keywords from buyer request and identify the product category.

Further continuing with FIG. 7 in Step 712 central controller 15 checks a sellers-database for keywords subscriptions of each seller 19. Method 714 shows an example of central controller 15 using a method such as a SQL (Standard Query Language) query to check a keyword subscriptions database. However, other such methods may be used in other embodiments of the present invention depending on a database interface.

In Step 716 central controller 15 may apply any filtering criteria as specified by buyer 10a in an initial bid offer request of Step 704. A non-limiting example of such filtering criterion may be specific location proximity for seller devices 17. Other embodiments of the present invention can use none, fewer and/or more extensive filtering criterion.

In Step 720 central controller 15 checks if any seller satisfies a criterion for forwarding a bid offer request to those seller devices 17. If central controller 15 finds no such seller in Step 720 then it asks buyer 10a to re-enter the product description in Step 722. If buyer 10a decides to modify the product description in Step 724 then the above process repeats from Step 710 onwards. If buyer 10a decides not to modify the product description in Step 724 then in Step 726 central controller 15 notifies buyer 10a that no sellers 19 are available for the bid offer request and the process ends. However, if in Step 720 central controller 15 finds sellers who meet the criterion then central controller 15 creates a new request ID for tracking purpose by using the method of Block 728. One non-limiting example of a method in Block 728 for one embodiment is to use a hash function (a hash function maps a sequence of bytes to another sequence of bytes, wherein the second sequence of bytes is usually smaller in length than the first one) with buyer's request id, buyer id, seller ids and product id as inputs. Other methods can be used in certain other embodiments of the present invention. Controller 15 also attaches the buyer id, seller ids, and product description etc. before storing the request in a bid requests database. In Step 730 central controller 15 notifies buyer 10a that his/her request has been successfully received.

FIG. 8A shows the flow diagram of one embodiment of central controller 15 further processing the bid offer requests received from buyers 10. In Step 800 of FIG. 8A, central controller 15 polls a requests database using, for example, a database interface method such as a SQL query. In Step 802, controller 15 checks for any pending requests at a specified interval as configured by a system operator. If there are any pending requests then in Step 804, controller 15 retrieves one such request from the requests database. In Step 806, controller 15 extracts a seller identifier associated with the request to find a seller profile for the given seller identifier in the sellers database as shown in block 808. In Step 810, controller 15 combines buyer 10a's request with other attributes such as buyer 10a's system rank, buyer 10a's location, current time, etc. In Step 812, controller 15 applies a filtering criteria specified by the associated seller such as buyer 10a's system rank, buyer 10a's location, and current time, et cetera, as shown in block 814. In Step 816, controller 15 determines if the request satisfies the criteria. If the filtering criteria is satisfied then in Step 818 controller 15 initiates a network connection with seller 19a if a connection does not already exist at the time of the request. Once the connection is established then in Step 820, controller creates a transaction ID using a hash function with at least a buyer ID, a seller ID, and a request ID as inputs as shown in Block 822. In Step 824, seller 19a acknowledges the receipt of the bid offer request and after receiving the acknowledgement controller 15 increases the count of the sellers associated with the request id in Step 826. Finally, in Step 828 controller 15 sends a notification to buyer 10a that the bid offer request has been forwarded to one or more sellers 19 and is currently awaiting bid offer responses from at least one sellers 19.

Figure 8B:
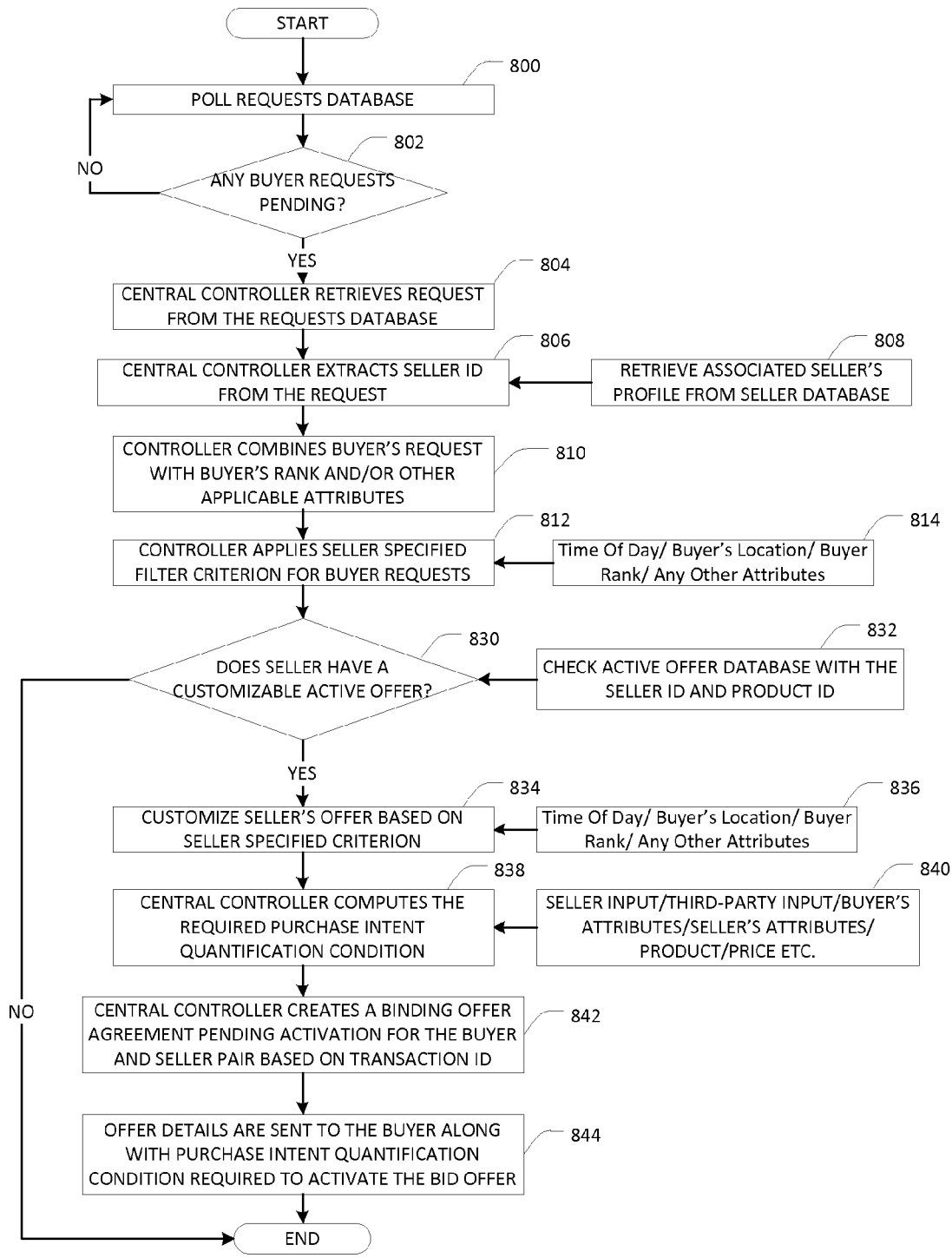

FIG. 8B shows flow diagram for another embodiment of the present invention where controller 15 responds on the behalf of seller 19a to send a bid offer response to a bid offer request from buyer 10a. As shown in FIG. 8B, Step 800 through Step 814 are the same as shown for one embodiment in FIG. 8A. Proceeding further from Step 812 in FIG. 8B, in Step 830 central controller 15 checks if seller 19a already has a customizable active offer by accessing the active offers database as shown in block 832. In Step 834 controller 15 customizes the seller's active offer based on criteria specified by seller 19a as shown in block 836. In Step 838 controller 15 calculates a required token pre-purchase payment amount based on a purchase intent quantification factor. Controller 15 also generates an initially inactive purchase agreement and associates it with a transaction identifier between buyer 10a and the seller 19a. Such purchase agreement may, for example, identify buyer 10a, seller 19a, a product and other terms and conditions for availing the seller 19a's bid offer. In Step 844, offer details are then sent to buyer 10a in a secure message over a communication channel.

FIG. 10 shows the flow diagram of one embodiment of the interaction between seller 19a and central controller 15 for submitting a bid offer response. In Step 1000 seller 19a initiates a network connection with central controller 15 and reviews one or more received bid offer requests from buyers 10. Step 1000 may use an optional seller verification mechanism involving login and password verification. In Step 1002, seller 19a then selects a bid offer to respond to and submits the bid offer response to buyer 10a. In Step 1004 seller 19a provides the bid offer details such as product description, product images, buyers' reviews, offered price or discount, location of purchase, offer validity period, etc. as shown in Block 1006. Other details may be chosen by seller 19a in certain other embodiments of the present invention.

In another embodiment, an offered price contained in a bid offer response message in Step 1004 may be a range of prices or discounts as a range of discounts. An exact price or an exact discount may be determined only at the time of an offer activation by buyer 10b.

Figure 11:
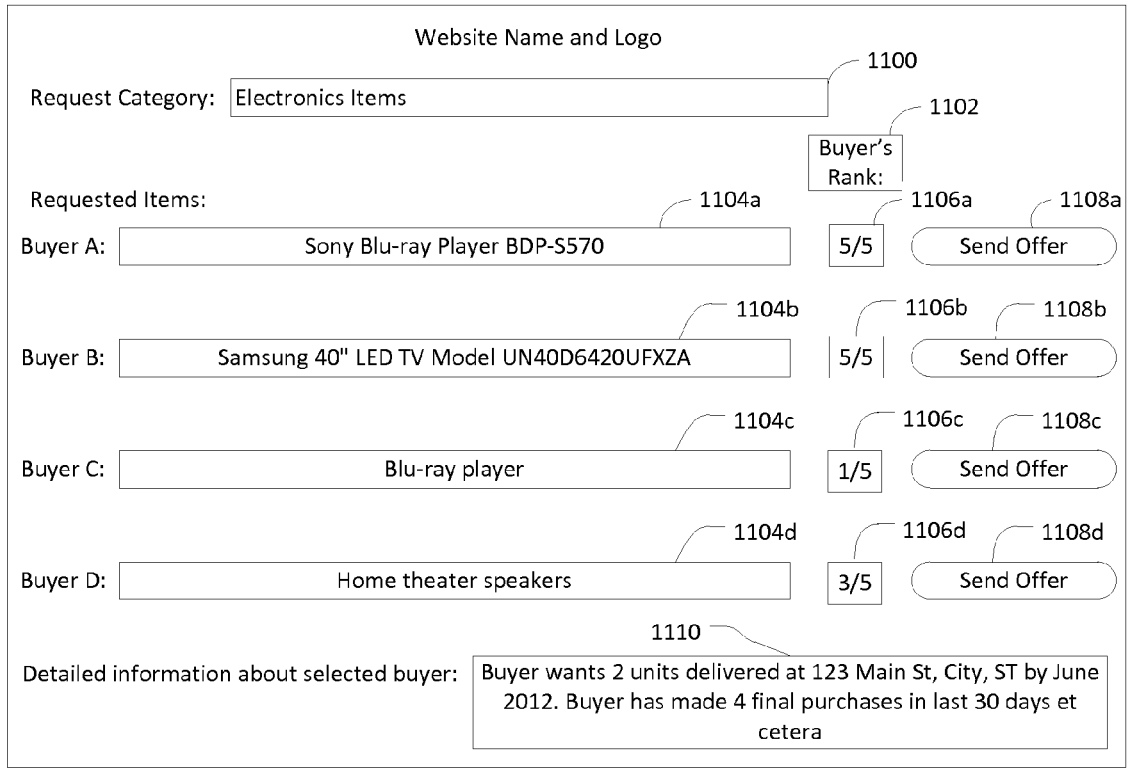
FIG. 11 shows one example of a webpage for central controller and seller interaction.

In Step 1008, seller submits the bid offer response to the central controller using a communication interface. FIG. 11 shows one example of such communication interface using a webpage. However, webpage in FIG. 11 shows only relevant fields in one embodiment. Actual webpage will be designed artistically and may include other informational fields. Other embodiments of the present invention may use other communication interfaces including, but not limited to, electronic mail, phone, facsimile etc.

FIG. 11 shows several bid offer requests as received by seller 19b from a plurality of buyers 10. Seller 19b may subscribe to a keyword search in multiple product categories. Field 1100 in FIG. 11 shows a first product category. Bid offer request received from each buyer is shown in a separate row identified as Buyer A, Buyer B etc. Fields 1104*a*, 1104*b* etc. show the product keywords applicable to a bid offer request received from the respective buyers. Column 1102 includes multiple fields 1106*a*, 1106*b*, 1106*c*, 1106*d* etc. showing respective buyer's rank on, for example, a scale of 1-to-5 in the system. A buyer's rank in the system may be computed dynamically by central controller 15 and stored in a buyer database. Buttons 1108*a*, 1108*b*, 1108*c* and 1108*d* etc. are used to submit the bid offer response corresponding to the bid offer request received from the respective buyers. In some embodiments, seller 19*b* may request controller 15 to provide additional information about a selected buyer as shown in field 1110. An exemplary set of field values, rank measurement scales etc. are shown in FIG. 11 by the way of non-limiting examples purpose only. Actual field values and rank measurement scale may be different in another embodiment.

Referring back to FIG. 10, in Step 1010 central controller 15 computes a required token pre-purchase price for a quantification of buyer 10*b*'s purchase intent to complete a purchase transaction with seller 19*b*.

A method to determine the required token pre-purchase price for purchase intent quantification with buyer 10*b*, seller 19*b* and transaction attributes illustrated in Table 1 is described below. However, the present invention is not limited to the purchase intent quantification using factors illustrated in Table 1, and other factors may also be used.

TABLE 1

| Transaction Attribute | Description |
|---|---|
| D | % of discount offered by the seller or as calculated by the controller based on offered price and incentives |
| P | Average market price for a product as determined by the controller |
| Q | Purchase intent quantification factor |
| T | Validity period of a bid offer response after activation (in days) |
| PS | Seller's system rank percentile |
| PB | Buyer's system rank percentile |

$$(PS-PB)/100+T/365=Q \quad (1)$$

$$D*P*Q=\text{Required token pre-purchase price} \quad (2)$$

In another embodiment where buyer 10*b* uses, for example, a portable device to communicate with central controller 15 wherein device 12*b* has a location information capability such as Global Positioning System (GPS) and/or Differential GPS (DGPS) then controller can use location coordinates to derive the purchase intent quantification factor. In such case if (Blat, Blong) describe buyer 10*b*'s latitude and longitude coordinates respectively at time t where t is the time when buyer 10*b* submits a bid offer request. And similarly if (Slat, Slong) describe seller 19*b*'s latitude and longitude coordinates respectively at time t. Then, the following equations show computation of purchase intent quantification factor Q and determination of the required token pre-purchase price using a computer program as:

$$R = 6371 \quad (3)$$

$$Pi = 3.1416 \quad (4)$$

$$dLat = (Blat - Slat) * Pi/180 \quad (5)$$

$$dLong = (Blong - Slong) * Pi/180 \quad (6)$$

$$a = \sin^2(dLat/2) + \quad (7)$$
$$\sin^2(dLong/2) * \cos(Blat * Pi/180) * \cos(Slat * Pi/180)$$

$$c = 2 * \text{atan2}(sqrt(a), sqrt(1-a)) \quad (8)$$

$$d = R * c \quad (9)$$

$$\text{And Purchase Intent Quantification Factor } Q = \begin{cases} \dfrac{d}{10}, & \text{if } d < 10 \\ \dfrac{1}{d}, & \text{if } d >= 10 \end{cases} \quad (10)$$

$$D * P * Q = \text{Required token pre-purchase price} \quad (11)$$

Factors D, P and Q have the same meaning as described in Table 1.

It can be appreciated by one with ordinary skill in the art that other complex methods may be used for purchase intent quantification in another embodiment of the present invention. For example in one embodiment of the present invention, purchase intent quantification factor Q may be directly input by seller along with the bid offer response.

Further continuing with FIG. 10, in Step 1014 central controller generates a purchase agreement that clearly identifies buyer 10*b*, seller 19*b*, the product and other, for example, terms and conditions for availing seller 19*b*'s bid offer as specified in the bid offer response submitted by the seller in Step 1008. In Step 1016 central controller forwards the response to the buyer along with the purchase agreement and the purchase intent quantification condition required to activate the bid offer as well as purchase agreement.

Figure 12:
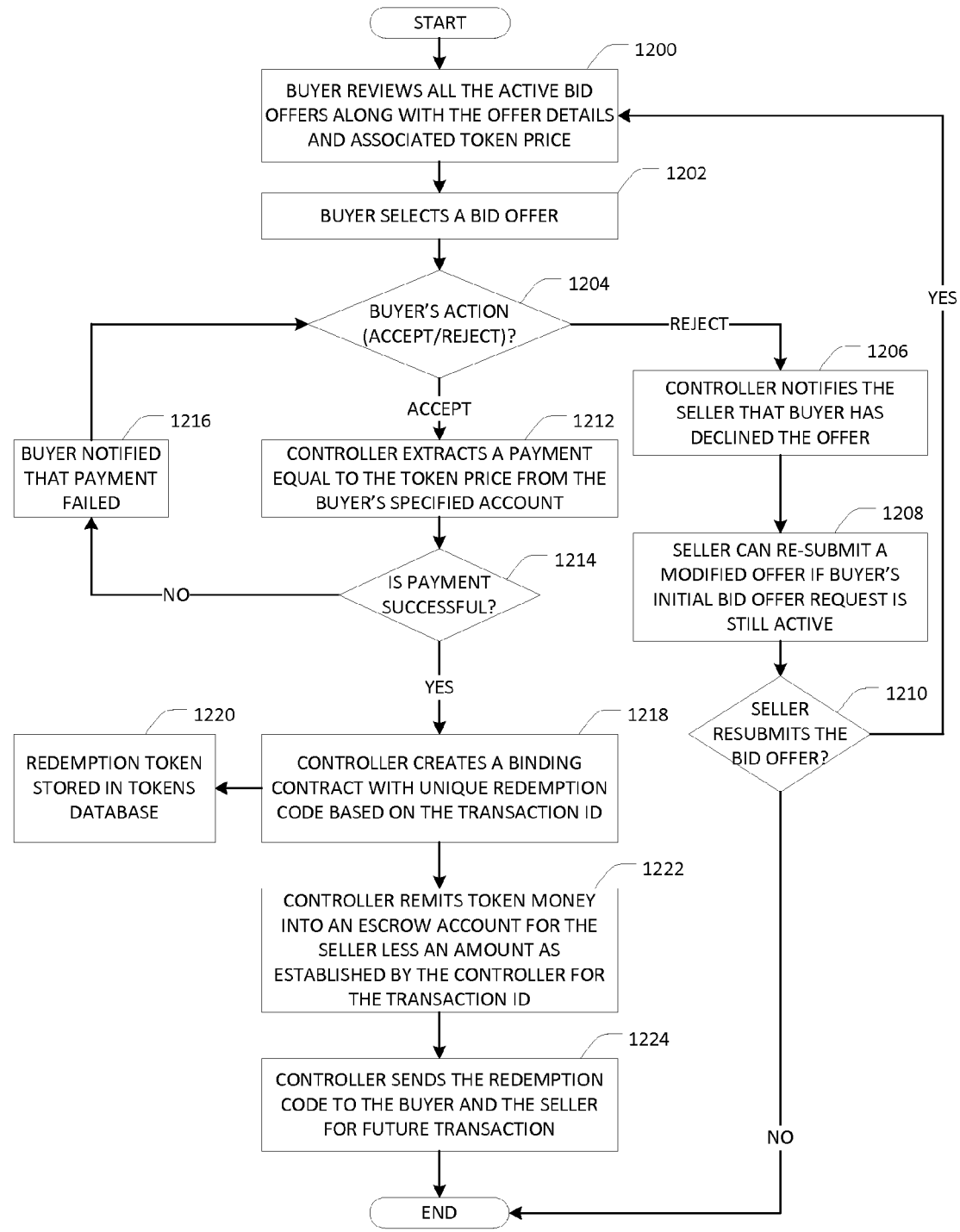
FIG. 12 illustrates a flow diagram for one embodiment of the interaction with buyer when buyer activates the bid offer response.

FIG. 12 illustrates a flow diagram for one embodiment of the interaction between the buyer 10*b* and controller 15 after buyer 10*b* has received at least one bid offer responses from the at least one sellers 19. In Step 1200 buyer 10*b* reviews the at least one bid offer responses from at least one sellers 19. One such example for an embodiment of the present invention to display the bid offers is shown in FIG. 9B.

FIG. 9B shows a webpage by the way of a non-limiting example only to display a bid offer responses received from plurality of seller devices 17 to demonstrate the fields and features relevant to one embodiment of the present invention. Fields 924A to 924E in FIG. 9B show by the way of non-limiting examples some possible variations of bid offers as submitted by the seller devices 17. Buyer 10*b* can also send a request to controller 15 to provide additional information about seller 19*b* as shown in the field 930. Field 932 contains a placeholder for advertisements and other relevant information.

In other embodiments seller devices 17 may communicate their respective bid offers and token pre-payment amount required for bid offer activation through another webpage or other methods of communication including, but not limited to, electronic mail (e-mail), phone and facsimile, et cetera.

Referring back to FIG. 12, in Step 1202 buyer 10*b* selects a bid offer from a plurality of received bid offers. At this point, any other remaining terms and conditions related to the bid offer are presented to buyer 10*b* in detail. FIG. 9C, again by the way of a non-limiting example in one embodiment shows a webpage that displays relevant fields for bid offer details. Field 946 in FIG. 9C shows as example where a purchase intent quantification condition may be a pre-payment amount that buyer 10b is required to pay for activating a conditional bid offer from seller 19b.

Further continuing with FIG. 12, in Step 1204 buyer 10b makes a decision to accept or reject the bid offer after reviewing all the bid offer details. If the buyer rejects the bid offer then seller 19b is notified of the buyer 10b's decision in Step 1206. In Step 1208, central controller 15 performs a check if a time period for buyer 10b's initial request in still valid and allows seller 19b to resubmit the modified bid offer response if seller 19b wants to do so. If in Step 1210 seller 19b decides to resubmit the bid offer response then above described process begins from Step 1200 otherwise buyer 10b and seller 19b communication process ends after Step 1210.

However, if in the Step 1204 buyer 10b decides to accept the bid offer response from seller 19b then in Step 1212, central controller 15 attempts to extract a payment amount equal to a token pre-payment amount required for activation from buyer 10b's payment account. Buyer 10b's payment account information is extracted from buyer 10b's profile as maintained in the buyer database. If no profile exists for buyer 10b in the buyer database, then central controller 15 asks buyer 10b to provide payment method information (e.g. credit card, debit card, bank account, gift card etc.) and extracts a payment from the payment channel.

In Step 1214 central controller 15 verifies if the payment was received successfully. If the payment was not received successfully then buyer 10b is notified about a failed payment in Step 1216 and process reverts to the Step 1204. However, if the payment was received successfully then central controller 15 generates a unique redemption token code in Step 1218 and stores it in the token database as shown in Block 1220.

In Step 1218 central controller 15 also converts the bid offer's terms and conditions into a purchase agreement between buyer 10b and the seller 19b. In Step 1222 central controller 15 deposits the payment (for example, cash and the like) into an escrow account for seller 19b after deducting any fees, commissions and/or other deductions as clearly identified by central controller 15 for the purpose of the transaction. In Step 1224 central controller 15 sends the redemption token code to both buyer 10b and seller 19b for the purpose of a future purchase transaction. Contract details for the future purchase transaction may be associated with the redemption token code and may be retrieved from central controller 15 by both buyer 10b and the seller when needed.

Figure 13:
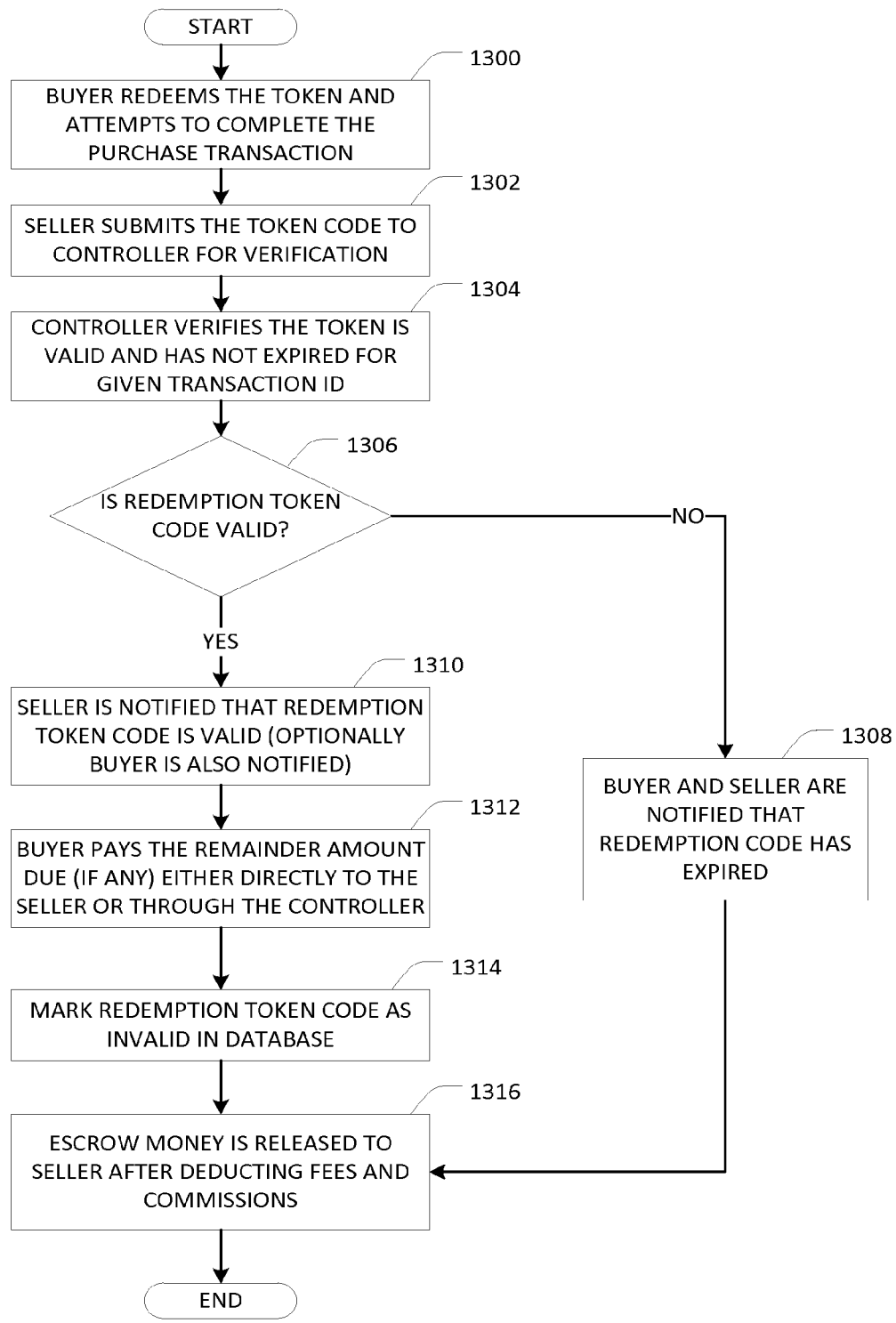
FIG. 13 shows a flow diagram of one embodiment where final purchase transaction is also effectuated by the central controller system.

FIG. 13 shows the flow diagram of one embodiment of the present invention where a final purchase transaction is also effectuated by central controller 15. In Step 1300 buyer 10b presents a token code to seller 19b for a final purchase transaction. In Step 1302 seller 19b submits the token code to central controller 15 for verification using an established communication method between seller 19b and central controller 15. Such communication can be, for example, over the web or electronic mail or facsimile or any other communication method as described earlier. In Step 1304 central controller 15 verifies if the token code is valid and also if the token code has not already expired. If in Step 1306 central controller 15 determines that token code is not valid, then in Step 1308 central controller 15 notifies both seller 19b and buyer 10b that the token code is not valid. If in step 1306 controller 15 determines that the token code is valid then in Step 1310 controller 15 notifies seller 19b and optionally buyer 10b as well, that the token code is valid. In Step 1312 buyer 10b pays a remainder amount required for purchase either directly to seller 19b or through central controller 15.

In Step 1314 central controller 15 marks the token code as invalid in a token database. In Step 1316, central controller 15 transfers all payments received from buyer 10b as applicable to the transaction identifier associated with the token code to seller 19b after deducting any transaction fees and/or commissions as defined in a purchase agreement.

An Example of Buyer Ranking Method

In one embodiment of the present invention each buyer 10 has a rank in the system as assigned by central controller 15 in the system of FIG. 1. By the way of non-limiting example one ranking method associates a number from 1 to 5 with each buyer whereas rank 1 designates a serious buyer while rank 5 designates a "simply seeking" buyer. Buyer's rank is dynamic and changes over time based on the previous searches, bid offer activations and completed purchase transactions. As shown in Field 51 of FIG. 5, buyer 10b's rank may be combined with the buyer 10b's request and communicated to seller 19b so that seller 19b can choose an appropriate bid offer for buyer 10b. Seller 19b and/or central controller 15 may utilize buyer 10b's rank information to customize a bid offer response for buyer 10b.

An Example of Seller Ranking Method

In one embodiment of the present invention each seller 19 has a rank in the system as assigned by central controller 15 in the system of FIG. 1. By the way of non-limiting example, one ranking method associates a number from 1 to 5 with each seller whereas rank 1 designates a quality seller while rank 5 designates a new seller. Seller's rank may be dynamic and may change over time based on a previous bid offers, bid offers activated by buyers, and/or completed purchase transactions. Seller 19b's ranking may be determined based on a quality of product delivery and a product itself as determined by previous buyers 10. Seller 19b's quote might be presented to the buyer in the order of seller ranking, offered price, location proximity, product match, product availability and any other such criterion.

Figure 14:
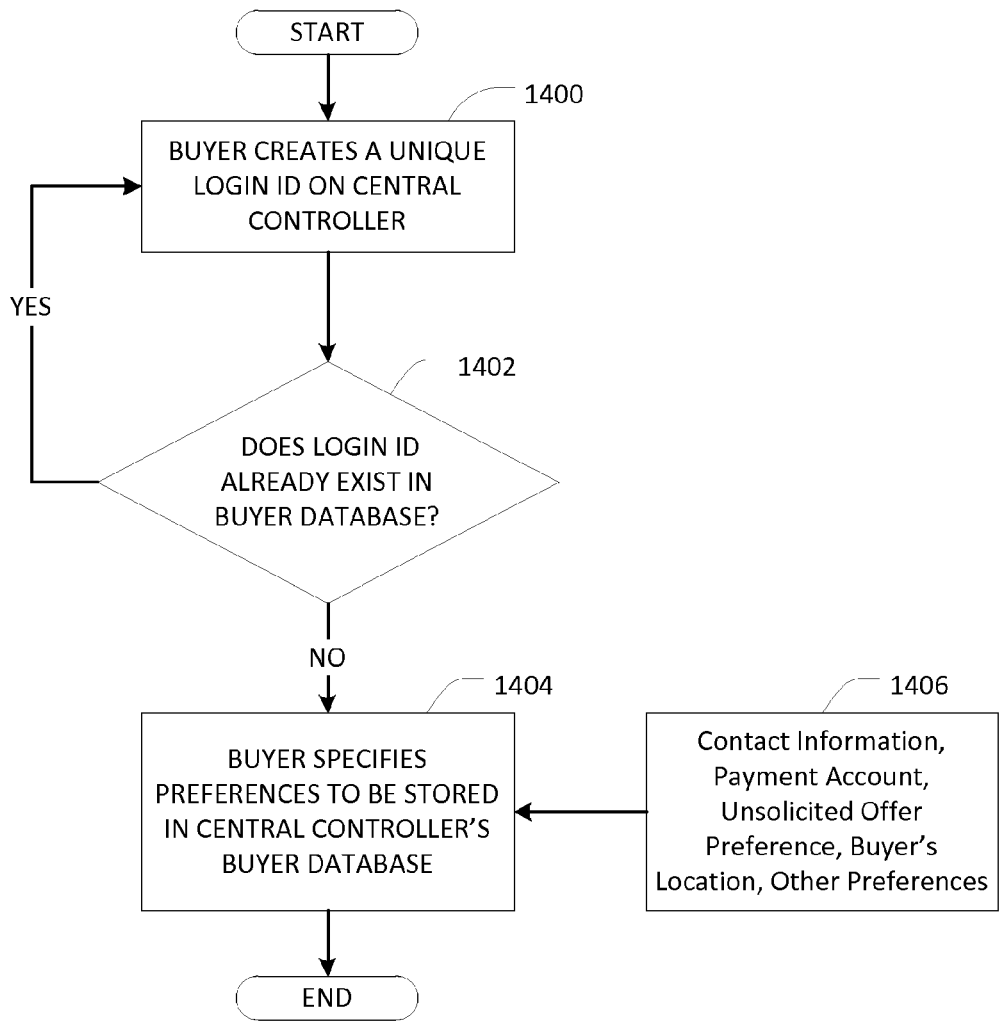
FIG. 14 shows the flowchart of an embodiment of the buyer registering an account with the central controller.

FIG. 14 shows the flow diagram for one embodiment where buyer 10b first registers with central controller 15 by creating a profile. In Step 1400 buyer 10b selects a login identifier for itself. In Step 1402 central controller 15 checks in a buyer database whether any other buyers 10 already have the same login identifier. If another one of buyers 10 exists with the same login identifier, then controller 15 asks the buyer to select another identifier. If no other one of buyers 10 exists with the same identifier, then controller 15 allows buyer 10b to proceed to Step 1404. In Step 1404 buyer 10b selects a password to securely access buyer 10a's profile as stored in a buyers database. Block 1406 describes other attributes to be stored in the buyers database in buyer 10b's profile including but not limited to contact information, payment information, shipping and billing address information and any other preferences as provided by the buyer.

Figure 15:
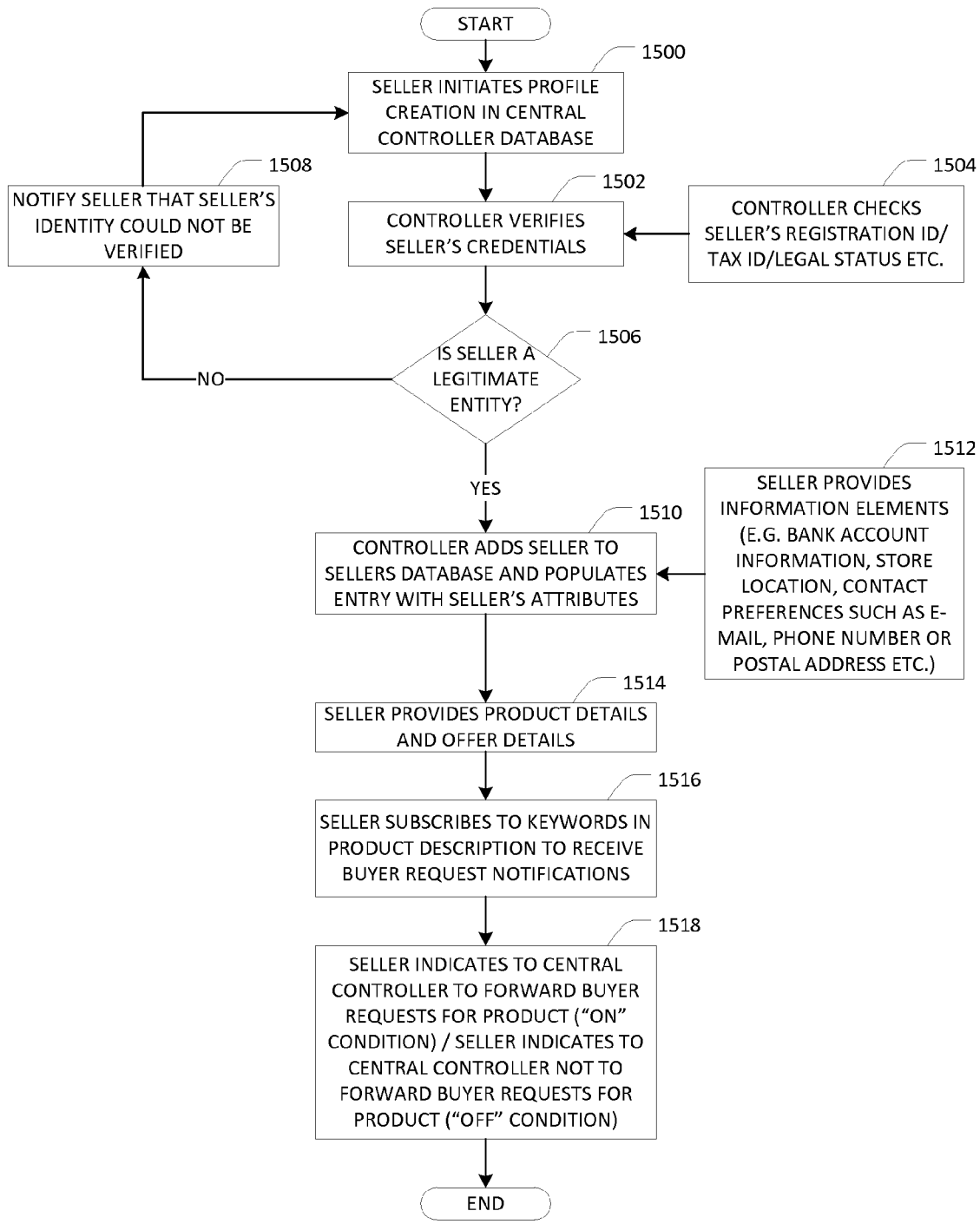
FIG. 15 shows the flowchart of an embodiment of seller registering an account with the central controller.

FIG. 15 shows a flow diagram of one embodiment of a seller registering with the central controller. In Step 1500 seller 19b initiates a profile creation with central controller 15. In Step 1502 central controller 15 verifies credentials of seller 10b by external methods described in block 1504. Such methods may include, but are not limited to, verifying business tax records, registration information, etc. If in Step 1506 controller 15 is not able to verify seller 19b's identity, then it notifies seller 19b in Step 1508. If seller 19b's identity is valid then seller 19b is assigned a unique seller identifier in the system in Step 1510. Block 1512 shows attributes of additional profile information associated with seller 19b that may be provided by seller 19b and the same are stored in a sellers database of central controller 15. In optional Step 1514, seller 19b may provide product details and offer details to be presented to buyers 10 based on seller 19b specified criterion. If seller 19b selects this option then seller 19b does not need to be notified by the central controller every time a bid offer request is received from buyer 10b for the product.

However, seller 19b can also choose to be notified for each bid offer request from buyer 10b. In Step 1516 seller 19b subscribes to product keywords for which it wants to receive notification of bid offer requests. Block 1518 describes by the way of a non-limiting example a conditional variable based mechanism. The value of this conditional variable is stored in the sellers database associated with a seller profile that is controlled by the seller 19b. This variable indicates to the central controller if seller 19b wants to receive real-time bid offer notifications or not.

Figure 16:
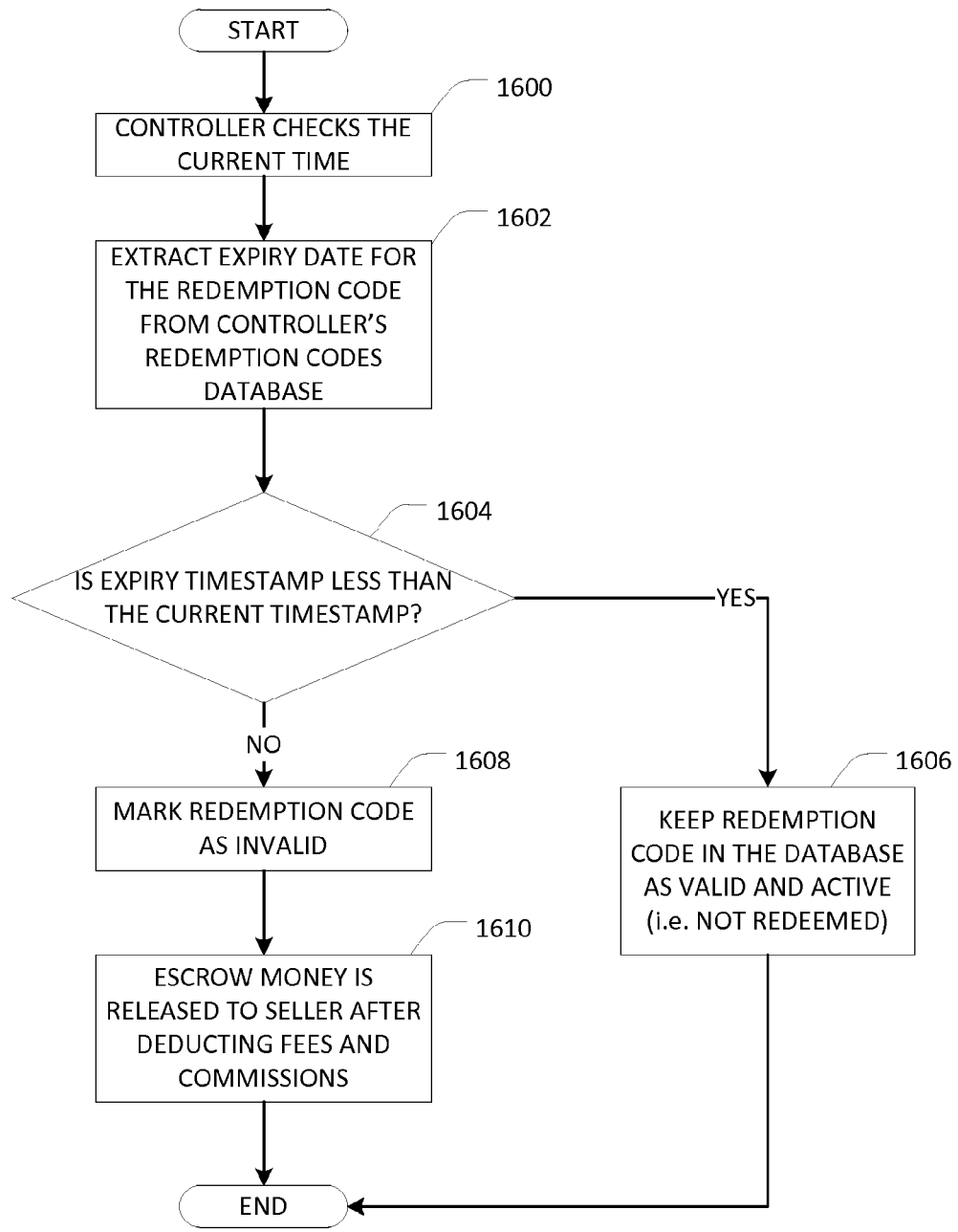
FIG. 16 shows the flowchart of an embodiment of central controller checking the valid active tokens in central controller database.

FIG. 16 describes a flow chart for an embodiment where controller checks the validity of the redemption token codes on a periodic basis. In Step 1600, central controller 15 checks a current time-of-day. In Step 1602, controller 15 extracts an expiration time associated with each redemption token code in a redemption token codes database. In Step 1604 controller 15 compares the expiration time of the redemption token code with the current time-of-day. If the expiration time is greater than the current time then that redemption token code is kept in a database marked as a valid code as shown in Step 1606. However, if the expiration time of the redemption token code is less than the current time then controller 15 marks the taken code as invalid in Step 1608. In Step 1610 controller 15 remits a pre-purchase token amount associated with that redemption token code to associated seller 19b after deducting any fees and/or commissions as established between controller 15 and the seller 19b.

Figure 17:
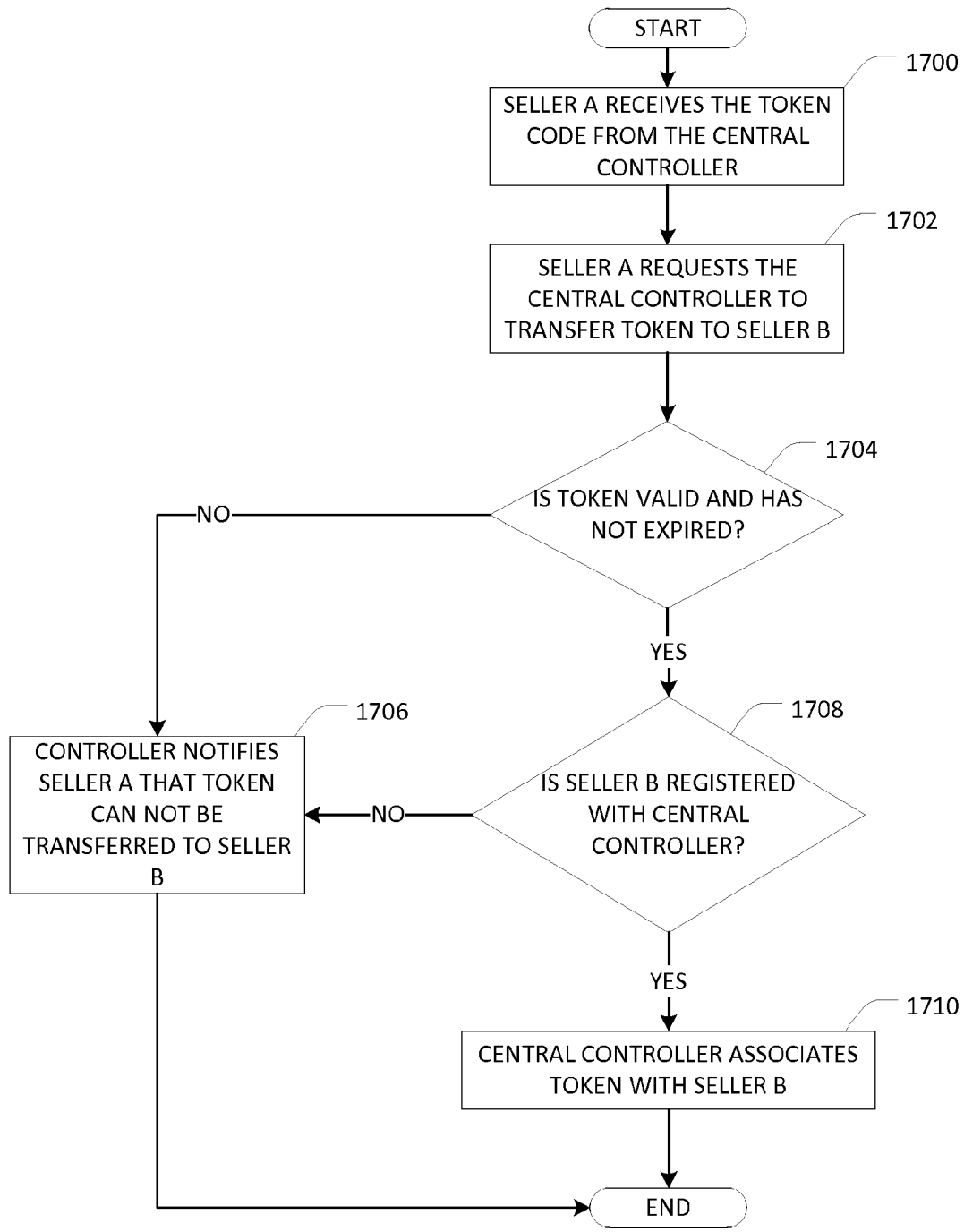
FIG. 17 shows the flowchart of one embodiment where a seller device transfers an active redemption token to be redeemed at another seller affiliated with the original seller.

FIG. 17 shows one embodiment of the present invention used by the original seller to transfer the redemption token code for redemption from another seller. After receiving a redemption token code from controller 15 in Step 1700, seller A submits a request to central controller 15 in Step 1702 to transfer the token code to seller B. In Step 1704 central controller 15 verifies if the redemption token code is still valid and the token has not expired. If the token is expired then in Step 1706 controller notifies the seller A that token cannot be transferred to seller B. If the token is valid then in Step 1708 controller 15 verifies if seller B is a registered seller with central controller 15. If seller B is a valid registered seller then in Step 1710 controller 15 modifies the parameters of the redemption token to mark seller B as a corresponding seller for the particular token.

While certain embodiments of the inventions have been described, these embodiments have been presented by the way of example only, and are not intended to limit the scope of the disclosure. Indeed, the novel methods and system described herein may be embodied in a variety of other forms; furthermore, various omissions, substitutions and changes in the form of the methods and systems herein may be made without departing from the spirit of the disclosure. The accompanying claims and their equivalents are intended to cover such forms or modifications as would fall within the scope and spirit of the inventions.

The skilled person will be aware of a range of possible modifications of the various embodiments described above. Accordingly, the present invention is defined by the claims and their equivalents.

What is claimed is:

1. A system for interaction between a plurality of network-connected buyer devices and a plurality of network-connected seller devices, comprising:
a network-connected controller computer comprising at least a processor and a storage device further comprising a program stored in the storage device and operating on the processor, the program when executed by the processor, causes the processor to:
receive a plurality of connections, over a network, from a plurality of seller devices;
receive a plurality of connections, over the network, from a plurality of buyer devices;
receive a plurality of subscriptions from the plurality of seller devices wherein the plurality of subscriptions subscribe to at least a plurality of seller product keywords, the plurality of seller product keywords corresponding to a plurality of products;
receive a bid offer request from a first buyer device of the plurality of buyer devices, the bid offer request comprising at least a plurality of buyer product keywords;
parse the bid offer request to identify at least one buyer product keyword;
identify at least one identified seller device from the plurality of seller devices that subscribe to the plurality of seller product keywords wherein the at least one of buyer product keywords is in a same category as an at least one seller product keyword of the plurality of seller product keywords;
send the bid offer request to the at least one identified seller device;
receive a plurality of conditional offer responses from at least a portion of the plurality of seller devices, each conditional offer response of the plurality of conditional offer responses comprising at least an offer and conditional variables, the conditional variables comprising a criterion to quantify a purchase condition;
send the plurality of conditional offer responses to the first buyer device;
receive a first activation response from the first buyer device, the first activation response fulfilling a purchase condition of a first conditional offer response from a first seller device whereby fulfilling the purchase condition activates a corresponding first offer of the first conditional offer response;
receive a fulfillment of the purchase condition, from the first buyer device, the fulfillment associated to processing and verifying a pre-payment;
generate a unique token code associated to the first offer;
send the token code to the first buyer device and to the first seller device.

2. The system of claim 1, wherein the controller computer quantifies the required purchase condition for each the conditional bid offer response.

3. The system of claim 1, wherein a quantification of the purchase condition for each the plurality of conditional offer responses is received from the plurality of seller devices.

4. The system of claim 1, wherein the token code specifies at least a validity period.

5. The system of claim 1, wherein:
the plurality of conditional offer responses is stored in a database and are searchable;
the plurality of conditional offer responses is sent to a second buyer device;
a selection of a second conditional offer response of the plurality of stored conditional offer responses is received, at the controller computer, from the second buyer device.

6. The system of claim 1, wherein a preference is received, at the controller computer, from a third buyer device for receiving unsolicited conditional bid offers.

7. The system of claim 1, wherein a profile containing attributes of a seller user is received, at the controller computer, from a second seller device, further wherein the profile is stored in the storage device.

8. The system of claim 1, wherein a profile containing attributes of a buyer user is received, at the controller computer, from a second buyer device, further wherein the profile is stored in the storage device.

9. The system of claim 7, wherein the variables of the purchase condition are computed, at the controller computer, based on the attributes of a seller user.

10. The system of claim 8, wherein the variables of the purchase condition are computed, at the controller computer, based on the attributes of a buyer user.

11. The system of claim 1, further comprising an escrow account associated with the first buyer device.

12. The system of claim 1, where a counteroffer response is received, at the controller computer comprising updated parameters of the purchase condition from the first buyer device.

13. A method for activating a conditional offer, comprising the steps of:
deploying a network-connected controller computer comprising at least a processor and a storage device further comprising a program stored in the storage device and operating on the processor, the program adapted to implement a system for managing interaction between a plurality of buyer devices and a plurality of seller devices;
receiving a plurality of connections, over a network, from a plurality of seller devices;
receiving a plurality of connections, over the network, from a plurality of buyer devices:
receiving, at the controller computer, a plurality of subscriptions from the plurality of seller devices wherein the plurality of subscriptions subscribe to at least a plurality of seller product keywords, the plurality of seller product keywords corresponding 5 to a plurality of products;
receiving, at the controller computer, a bid offer request from a first buyer device of the plurality of buyer devices, the bid offer request comprising at least a plurality of buyer product keywords;
parsing, at the controller computer, the bid offer request to identify at least one buyer product keyword;
identifying, at the controller computer, at least one identified seller device from the plurality of seller devices that subscribe to the plurality of seller product keywords wherein the at least one buyer product keywords is in a same category as an at least one seller product keyword of the plurality of seller product keywords;
sending, from the controller computer, the bid offer request to the at least one identified seller device;
receiving, at the controller computer, a plurality of conditional offer responses from at least a portion of the plurality of seller devices, each conditional offer response of the plurality of conditional offer responses comprising at least an offer and conditional variables, the conditional variables comprising a criterion to quantify a purchase condition;
sending, from the controller computer, the plurality of conditional offer responses to the first buyer device;
receiving, at the controller computer, a first activation responses from the first buyer device, the first activation response fulfilling a purchase condition of a first conditional offer response from a first seller device whereby fulfilling the purchase condition activates a corresponding first offer of the first conditional offer response;
receiving a fulfillment of the first purchase condition, from the first buyer device, the fulfillment associated to processing and verifying a pre-payment;
generating, at the controller computer, a unique token code associated to the first offer; and,
sending the token code to the first buyer device and to the first seller device.

14. The method of claim 13, wherein the controller computer assigns at least a validity period and transaction criterion to the token code.

15. The method of claim 13, wherein the first purchase condition is quantified as a pre-payment amount.

16. The method of claim 15, further wherein the pre-payment is deposited to an escrow account associated to the first buyer device.

17. The method of claim 13, wherein the purchase condition is quantified as required movement of the first buyer device over a predefined period of time.

18. The method of claim 13, wherein the plurality of conditional offer responses are stored in a database and are searchable.

19. The method of claim 13, further comprising the step of receiving, at the controller computer, a counteroffer comprising updated variables of the purchase condition from the first buyer device.

20. The method of claim 13, further comprising the steps of:
receiving, at the controller computer, a request from the first seller device to validate the token code at a time of a resulting transaction;
sending, from the controller computer, a positive or negative confirmation for the token code wherein validating the token code comprises the step of checking a plurality of token code parameters; and,
validating the plurality of token code parameters.

* * * * *